US009207440B2

(12) United States Patent
Harada

(10) Patent No.: US 9,207,440 B2
(45) Date of Patent: Dec. 8, 2015

(54) IMAGING LENS AND IMAGING APPARATUS INCLUDING THE SAME

(71) Applicant: FUJIFILM CORPORATION, Tokyo (JP)

(72) Inventor: Keisuke Harada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/451,459

(22) Filed: Aug. 5, 2014

(65) Prior Publication Data
US 2014/0340763 A1 Nov. 20, 2014

Related U.S. Application Data

(63) Continuation of application No. PCT/JP2013/000519, filed on Jan. 31, 2013.

(30) Foreign Application Priority Data

Feb. 6, 2012 (JP) ................................ 2012-023016

(51) Int. Cl.
G02B 15/14 (2006.01)
G02B 15/177 (2006.01)
(52) U.S. Cl.
CPC .................. *G02B 15/177* (2013.01)
(58) Field of Classification Search
CPC .... G02B 13/04; G02B 14/06; G02B 13/0045; G02B 15/177
USPC .......................... 359/680–682, 745–753, 684
See application file for complete search history.

(56) References Cited

U.S. PATENT DOCUMENTS 5,745,306 A 4/1998 Sato
2007/0201143 A1* 8/2007 Kohno et al. ................. 359/680
2011/0267708 A1 11/2011 Kon

FOREIGN PATENT DOCUMENTS

| JP | H08-327897 | 12/1996 |
| JP | 3084810 | 7/2000 |
| JP | 2004-126392 | 4/2004 |
| JP | 2006-53377 | 2/2006 |
| JP | 2007-322986 | 12/2007 |
| JP | 2011-232624 | 11/2011 |

OTHER PUBLICATIONS

International Search Report—PCT/JP2013/000519—Jun. 11, 2013.

* cited by examiner

*Primary Examiner* — Scott J Sugarman
(74) *Attorney, Agent, or Firm* — Young & Thompson

(57) ABSTRACT

The imaging lens substantially consists of a negative first lens group in which a biconvex lens, a cemented lens, a plurality of lenses including a positive lens and a negative lens are arranged; a positive second lens group including a cemented lens; a negative third lens group in which a single lens forming a meniscus lens with a convex surface toward the object side or a plurality of lenses constituted in such a manner that the absolute value of the radius of curvature of a lens surface disposed on the most image side is smaller than the absolute value of the radius of curvature of a lens surface disposed on the most object side; and a positive fourth lens group including a positive lens in this order from the object side. This imaging lens is configured in such a manner that conditional expression (1) is satisfied:

$0.7 < |f3 1/f < 4.0$.

20 Claims, 30 Drawing Sheets

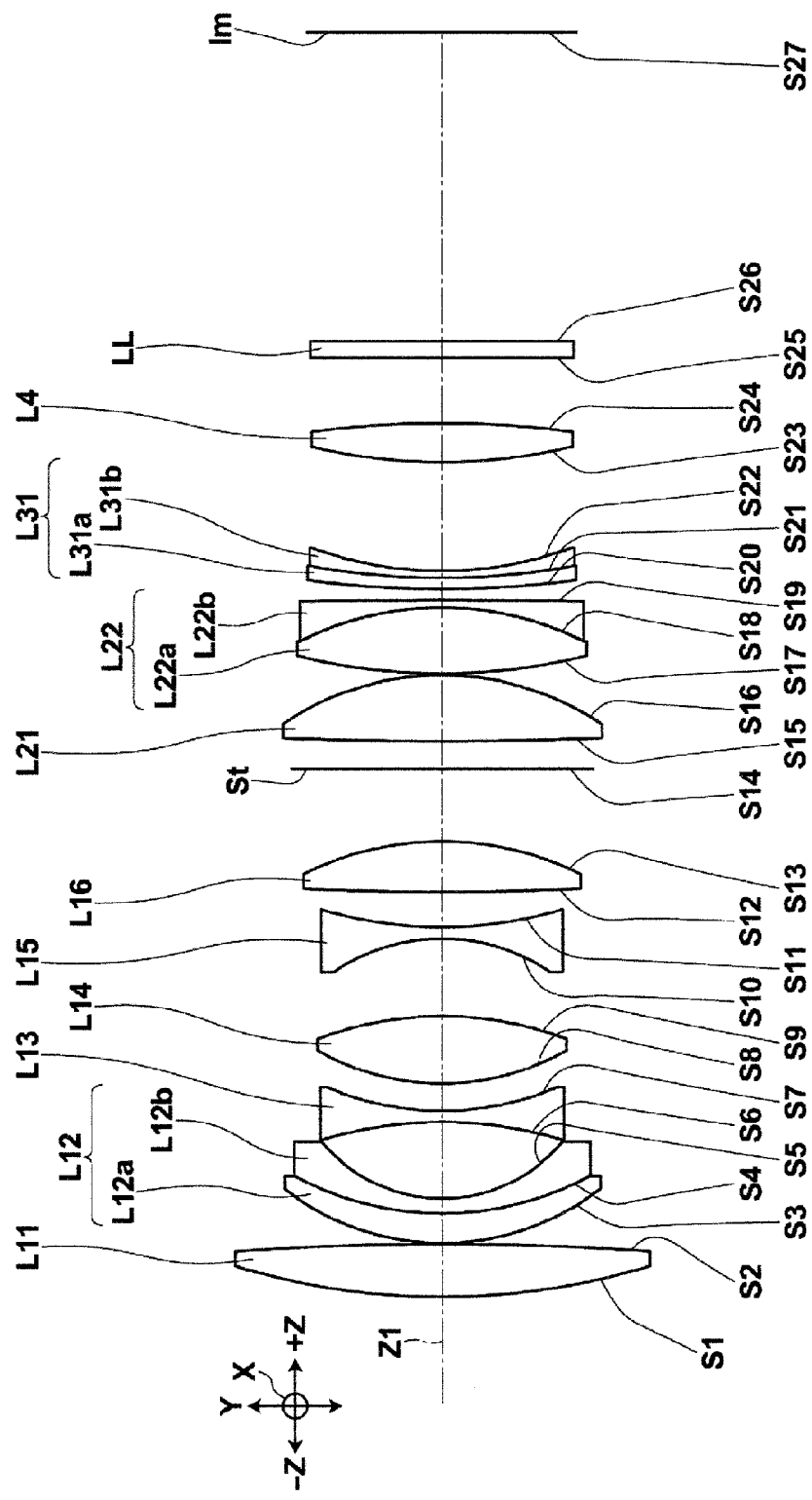

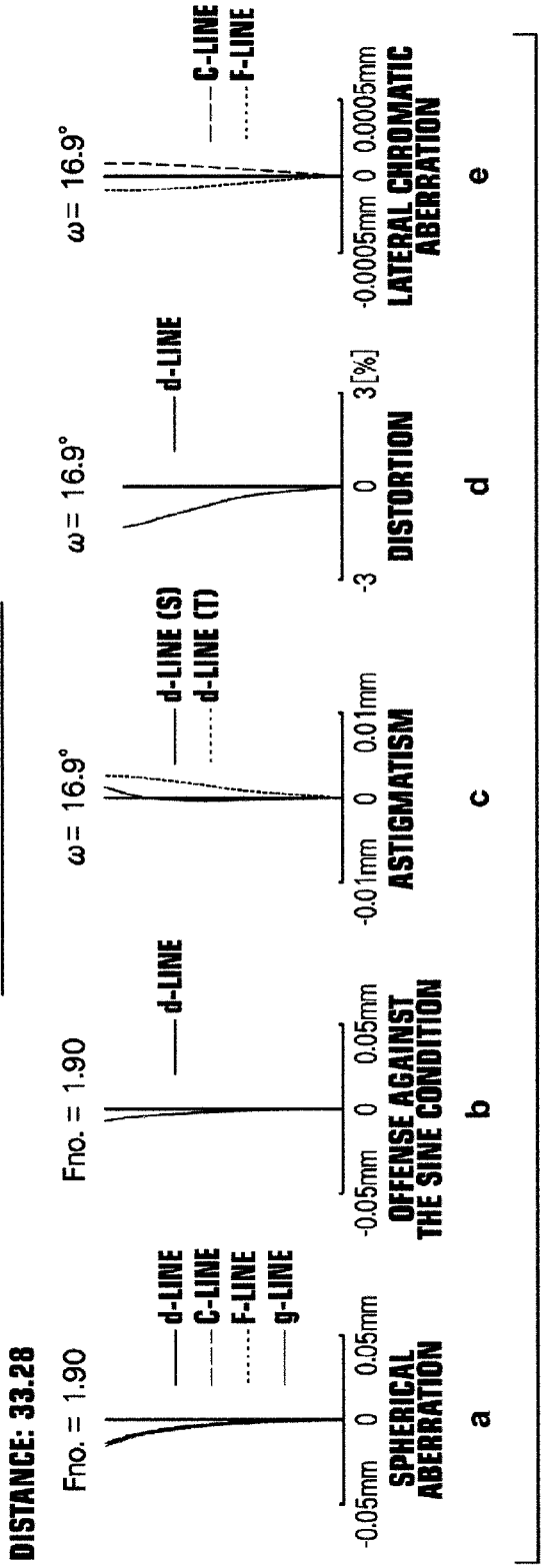

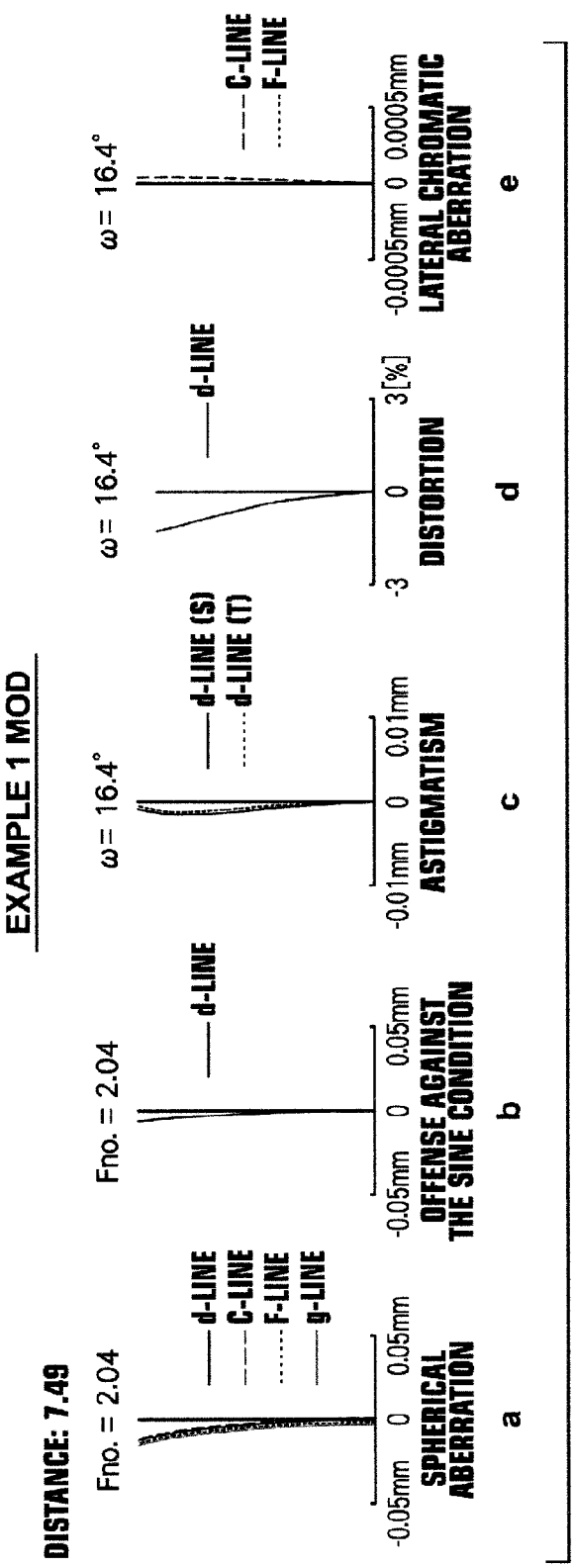

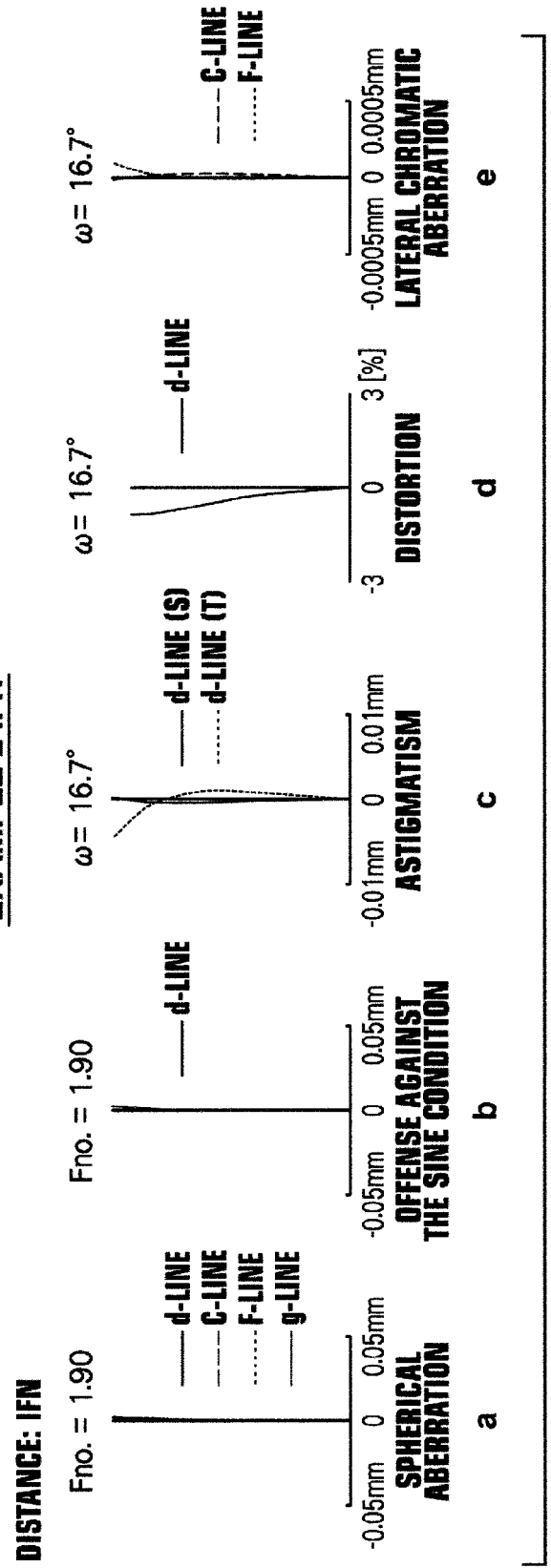

FIG.10C

EXAMPLE 2 MOD

DISTANCE: 7.47 a. Spherical Aberration — Fno. = 2.03; d-LINE, C-LINE, F-LINE, g-LINE; -0.05mm to 0.05mm b. Offense Against the Sine Condition — Fno. = 2.03; d-LINE; -0.05mm to 0.05mm c. Astigmatism — ω = 15.9°; d-LINE (S), d-LINE (T); -0.01mm to 0.01mm d. Distortion — ω = 15.9°; d-LINE; -3 to 3 [%]

e. Lateral Chromatic Aberration — ω = 15.9°; C-LINE, F-LINE; -0.0005mm to 0.0005mm

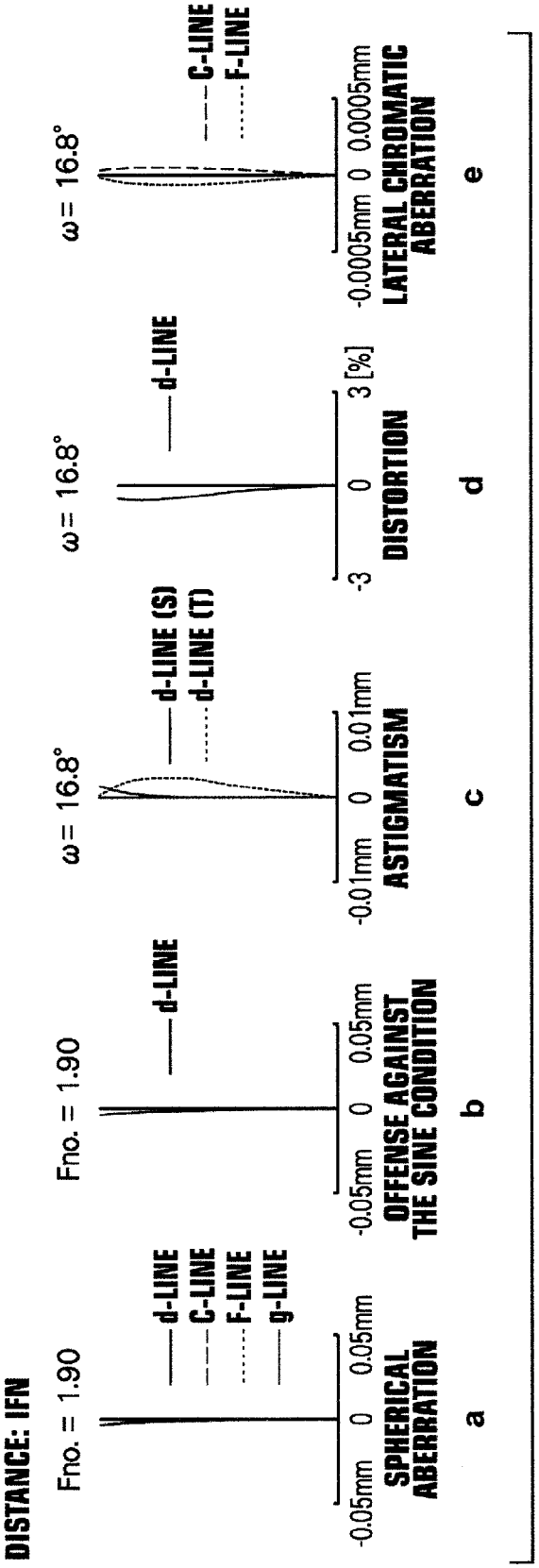

FIG.12C

DISTANCE: 7.48

EXAMPLE 4 MOD a. SPHERICAL ABERRATION — Fno. = 2.07, range -0.05mm to 0.05mm (d-LINE, C-LINE, F-LINE, g-LINE)

b. OFFENSE AGAINST THE SINE CONDITION — Fno. = 2.07, range -0.05mm to 0.05mm (d-LINE)

c. ASTIGMATISM — ω = 15.8°, range -0.01mm to 0.01mm (d-LINE (S), d-LINE (T))

d. DISTORTION — ω = 15.8°, range -3 to 3 [%] (d-LINE)

e. LATERAL CHROMATIC ABERRATION — ω = 15.8°, range -0.0005mm to 0.0005mm (C-LINE, F-LINE)

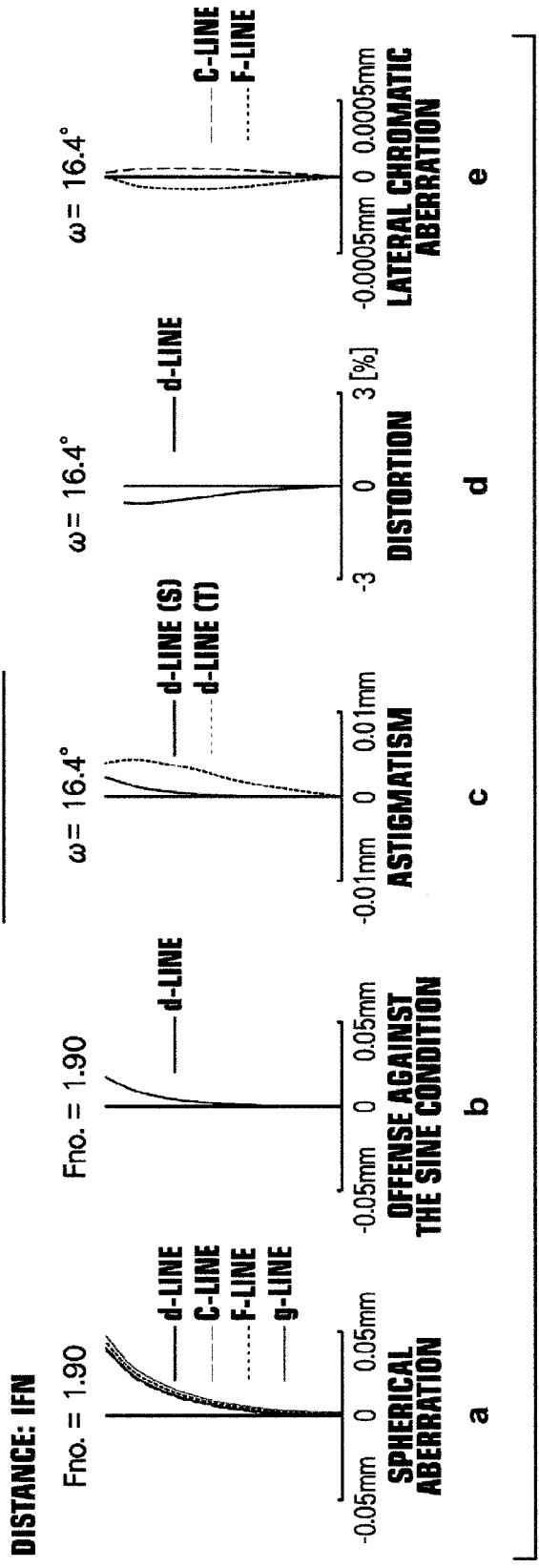

EXAMPLE 5 REFERENCE

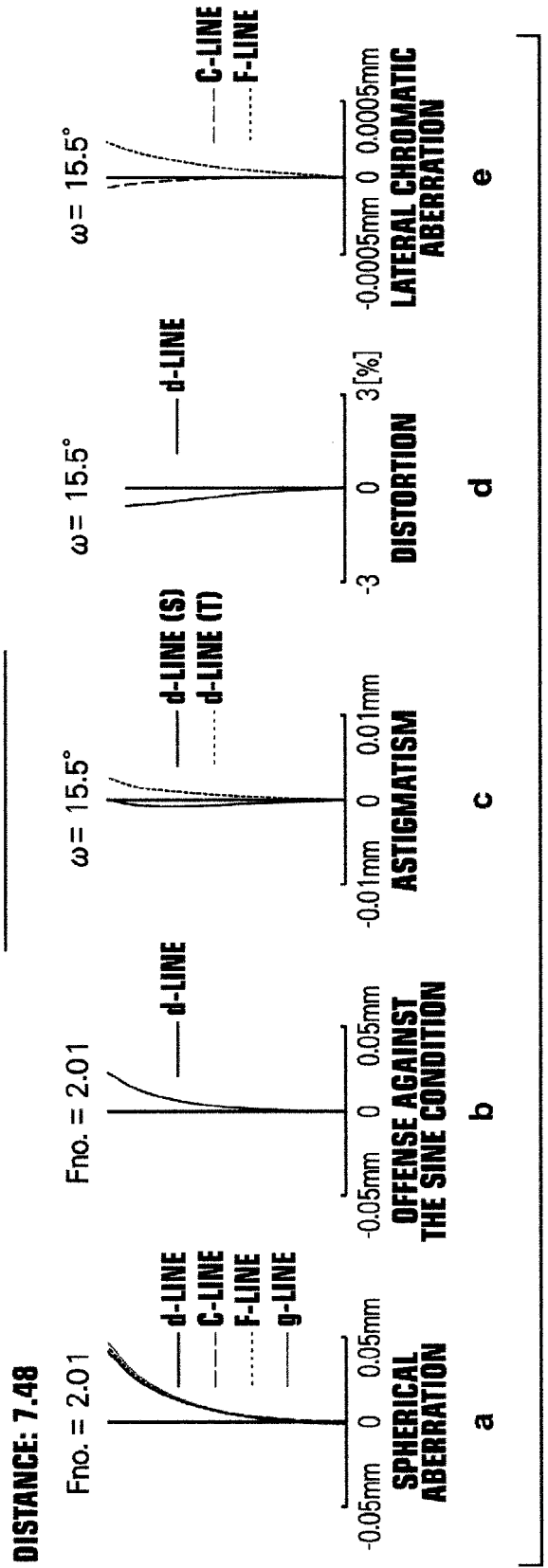

FIG.14B

EXAMPLE 6 REFERENCE

DISTANCE: 33.26 a. SPHERICAL ABERRATION — Fno. = 1.90, -0.05mm to 0.05mm; d-LINE, C-LINE, F-LINE, g-LINE b. OFFENSE AGAINST THE SINE CONDITION — Fno. = 1.90, -0.05mm to 0.05mm; d-LINE c. ASTIGMATISM — ω = 16.6°, -0.01mm to 0.01mm; d-LINE (S), d-LINE (T)

d. DISTORTION — ω = 16.6°, -3 to 3 [%]; d-LINE e. LATERAL CHROMATIC ABERRATION — ω = 16.6°, -0.0005mm to 0.0005mm; C-LINE, F-LINE

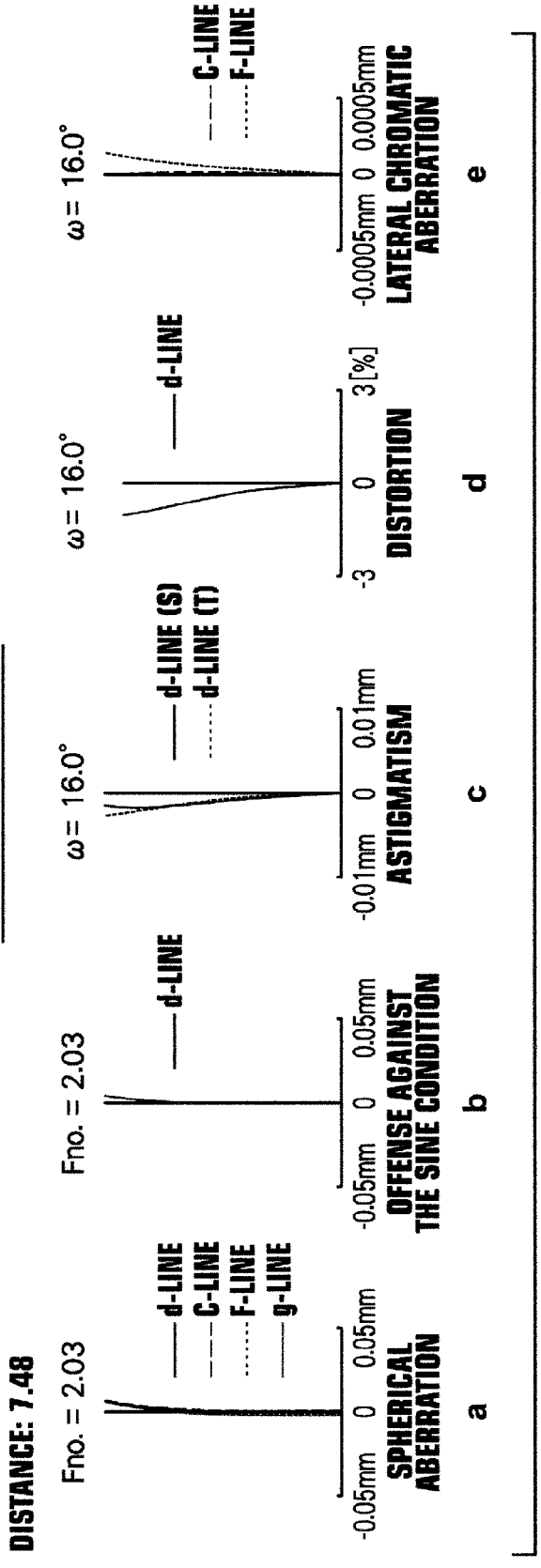

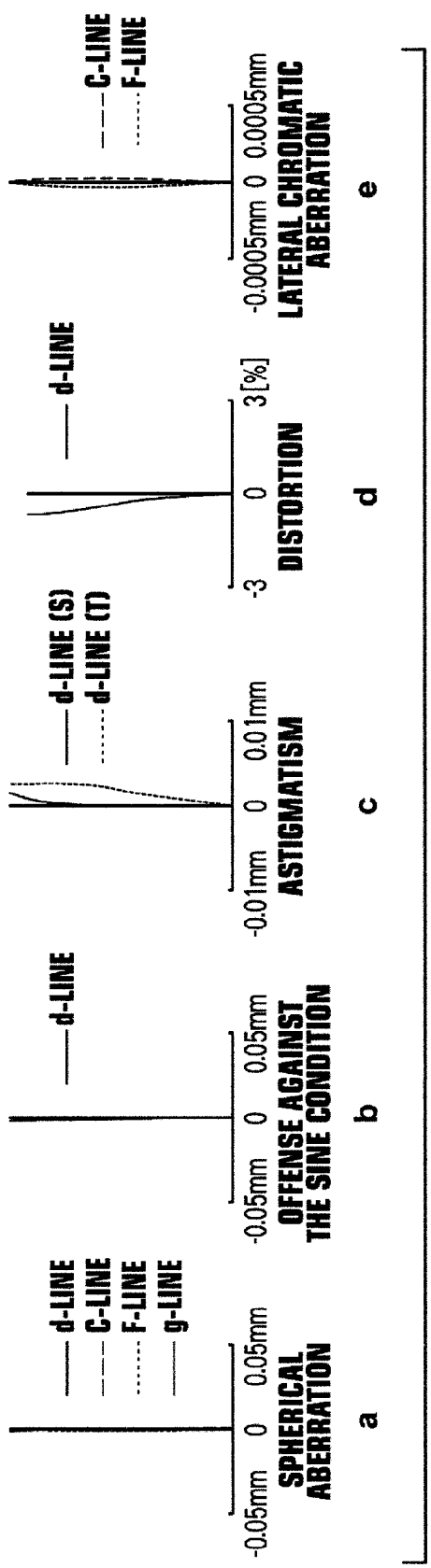

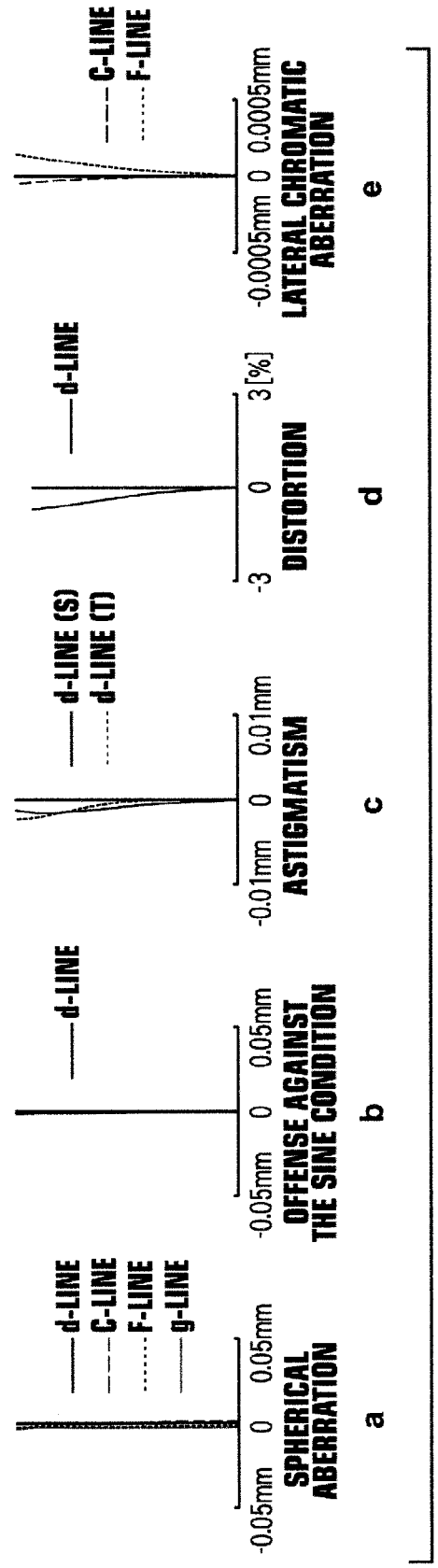

IMAGING LENS AND IMAGING APPARATUS INCLUDING THE SAME

CROSS-REFERENCE TO RELATED APPLICATIONS

This application is a Continuation of PCT International Application No. PCT/JP2013/000519 filed on Jan. 31, 2013, which claims priority under 35 U.S.C. §119 (a) to Japanese Patent Application No. 2012-023016 filed Feb. 6, 2012. Each of the above application(s) is hereby expressly incorporated by reference, in its entirety, into the present application.

BACKGROUND OF THE INVENTION

1. Technical Field

The present invention relates to a compact imaging lens having high performance, which is used for a digital camera, a broadcasting camera, a movie camera, and the like.

2. Description of the Related Art

Conventionally, methods in which the entirety of a lens system is extended or only a portion of lenses that constitute the lens system is moved so as to be brought into focus (perform focusing) at subject distances from far to near are known (refer to Patent Documents 1, 2, and 3 (Japanese Unexamined Patent Publication No. 2011-232624, Japanese Unexamined Patent Publication No. 2006-053377, and Japanese Patent No. 3084810)). In order to shorten time until focusing, there is demand for a lens group (a focusing group) which moves while focusing to reduce the weight thereof, thereby lightening the burden on a focusing mechanism. In such a case, the method in which only a portion of lenses that constitute a lens system is moved to perform focusing is appropriate. The method in which only a portion of lenses is moved to perform focusing is used by a zoom lens or a fixed focus lens that adopts an inner focus system. A telephoto lens with a large aperture ratio, which is configured such that a focusing group is disposed adjacent to a stop, is also known to adopt the method.

SUMMARY OF THE INVENTION

Imaging lenses disclosed in Patent Documents 2 and 3, however, have a problem that a focusing group becomes heavy and the burden of movement thereof will be increased because the outer diameter of lenses which constitute the focusing group becomes large or the thickness thereof is increased.

The imaging lenses disclosed in Patent Documents 2 and 3 include a region where the height of rays in the vicinity of a stop is low, chromatic aberration is not sufficiently corrected, and longitudinal chromatic aberration occurs. Such a chromatic aberration is required to be corrected so that the imaging lens will exhibit an excellent optical performance when white light passes therethrough.

The present invention has been developed in view of the above circumstances. It is an object of the present invention to provide an imaging lens in which focusing groups can be lightened and various aberrations such as spherical aberration and astigmatism as well as chromatic aberration can be excellently corrected; and an imaging apparatus including the same.

An imaging lens of the present invention substantially consists of four groups in which first lens group having negative refractive power, a stop, a second lens group having positive refractive power, a third lens group having negative refractive power, and a fourth lens group having positive refractive power are arranged in this order from the object side;

only the third lens group moves in the direction of the optical axis to perform focus adjustment;

the first lens group substantially consists of a biconvex lens, a cemented lens constituted by a lens having positive refractive power and a lens having negative refractive power, and a plurality of lenses which include at least one or more lenses having positive refractive power and at least one or more lenses having negative refractive power, in this order from the object side;

the second lens group includes at least one or more cemented lenses constituted by a lens having positive refractive power and a lens having negative refractive power;

the third lens group substantially consists of a single lens having a meniscus shape with a convex surface toward the object side and negative refractive power or substantially consists of a plurality of lenses having negative refractive power as a whole, which are configured in such a manner that the absolute value of the radius of curvature of a lens surface disposed on the most image side is smaller than the absolute value of the radius of curvature of a lens surface disposed on the most object side;

the fourth lens group includes at least one or more lenses having positive refractive power; and conditional expression (1) is satisfied:

$$0.7 < |f3|/f < 4.0, \text{ where}$$

f3: the focal length of the third lens group, and
f: the focal length of the entire lens system in a state focused on an object point at infinity.

The third lens group is moved to perform focusing from an object point at infinity to an object point at the closest distance by using the inner focus method.

Note that the plurality of lenses in the first lens group is disposed between the cemented lens and the stop and includes at least one or more lenses having positive refractive power and at least one or more lenses having negative refractive power.

The third lens group is a single lens having a meniscus shape with a convex surface toward the object side and negative refractive power. Alternatively, the third lens group substantially consists of a plurality of lenses having negative refractive power as a whole, which are configured in such a manner that an absolute value of a radius of curvature of a lens surface disposed on the most image side is smaller than an absolute value of a radius of curvature of a lens surface disposed on the most object side.

It is desirable for the imaging lens to satisfy conditional expression (1'): $1.0 < |f3|/f < 3.0$, and it is more desirable for conditional expression (1''): $1.2 < |f3|/f < 2.0$ to be satisfied.

It is desirable for the imaging lens to satisfy conditional expression (2): $0.6 < |f1|/f < 18.0$, it is more desirable for conditional expression (2'): $1.2 < |f1|/f < 10.0$ to be satisfied, and it is much more desirable for conditional expression (2''): $2.5 < |f1|/f < 4.5$ to be satisfied.

In this case, f1 is the focal length of the first lens group.

It is desirable for the imaging lens to satisfy conditional expression (3): $0.2 < f2/f < 5.0$, it is more desirable for conditional expression (3'): $0.5 < f2/f < 3.5$ to be satisfied, and it is much more desirable for conditional expression (3''): $0.8 < f2/f < 1.2$ to be satisfied.

In this case, f2 is the focal length of the second lens group.

It is desirable for the imaging lens to satisfy conditional expression (4): $0.8 < f4/f < 8.0$, it is more desirable for conditional expression (4'): 1.0<f4/f<4.0 to be satisfied, and it is much more desirable for conditional expression (4"): 1.3<f4/f<1.8 to be satisfied.

In this case, f4 is the focal length of the fourth lens group.

It is desirable for the imaging lens to satisfy conditional expression (5): 0.5<(R3f+R3r)/(R3f−R3r)<6.0, it is more desirable for conditional expression (5'): 1.0<(R3f+R3r)/(R3f−R3r)<4.5 to be satisfied, and it is much more desirable for conditional expression (5"): 1.3<(R3f+R3r)/(R3f−R3r)<2.5 to be satisfied.

However, R3f is a radius of curvature of a lens surface disposed on the most object side of the third lens group, and R3r is a radius of curvature of a lens surface disposed on the most image side of the third lens group.

It is desirable for at least one of the lens having positive refractive power and the lens having negative refractive power which constitute the cemented lens included in the first lens group to satisfy conditional expression (6): 22.0<|vd(1P)−vd(1N)|, and it is more desirable for conditional expression (6'): 35.0<|vd(1P)−vd(1N)| to be satisfied, and it is much more desirable for conditional expression (6"): 50.0<|vd(1P)−vd(1N)| to be satisfied.

It is desirable for at least one of the lens having positive refractive power and the lens having negative refractive power which constitute the cemented lens included in the first lens group to satisfy conditional expression (6): 22.0<|vd(1P)−vd(1N)|, and it is more desirable for conditional expression (6'''): vd(1P)−vd(1N)<−22.0 to be satisfied, and it is much more desirable for conditional expression (6''''): vd(1P)−vd(1N)<−35.0 to be satisfied.

In this case, vd(1P) is the Abbe number of the lens having positive refractive power which constitutes the cemented lens, and vd(1N) is the Abbe number of the lens having negative refractive power which constitutes the cemented lens.

In the case that a lens having positive refractive power is disposed on the most image side in the first lens group of the imaging lens, it is desirable for a cemented lens in the second lens group to satisfy conditional expression (7): 20.0<|vd(2P)−vd(2N)|. In this case, the cemented lens is formed by two lenses cemented to each other, between which the absolute number of the difference of the Abbe numbers is the greatest among cemented lenses formed by cementing a lens having positive refractive power and a lens having negative refractive power together in the second lens group. It is also desirable for a lens having positive refractive power disposed on the most image side in the first lens group to satisfy conditional expression (8): vd(1R)<35.0.

In this case, vd(2P) is the Abbe number of the lens having positive refractive power which constitutes the cemented lens, vd(2N) is the Abbe number of the lens having negative refractive power which constitutes the cemented lens, and vd(1R) is the Abbe number of the lens which is disposed on the most image side in the first lens group.

It is more desirable for the imaging lens to satisfy conditional expression (7'): 32.0<|vd(2P)−vd(2N)|, and it is much more desirable for conditional expression (7"): 48.0<|vd(2P)−vd(2N)| to be satisfied.

It is more desirable for the imaging lens to satisfy conditional expression (8'): vd(1R)<30.0.

An imaging apparatus of the present invention includes the imaging lens.

Note that the expression "the imaging lens substantially consists (consisting) of four lens groups" intends to include a lens that includes lenses substantially without any refractive power; optical elements other than lenses such as stops, cover glasses, and the like; and mechanical components such as lens flanges, lens barrels, imaging elements, and image stabilization mechanisms; in addition to the four lens groups. In such a manner, the imaging lens substantially consisting of four lens groups may consist of only four lens groups or may include lenses without any refractive power and optical elements other than lenses in addition to four lens groups.

The sign of the radius of curvature of a lens surface is positive in the case that a surface shape is convex on the object side, and negative in the case that the surface shape is convex on the image side.

A focal length of each lens, a focal length of plural lenses in combination (combined focal length) and a focal length of a lens group are represented in such a manner that a positive focal length and a negative focal length are distinguished from each other.

According to the imaging lens of the present invention and an imaging apparatus using this lens, the imaging lens substantially consists of four lens group in which a first lens group having negative refractive power, a stop, a second lens group having positive refractive power, a third lens group having negative refractive power, and a fourth lens group having positive refractive power are arranged in this order from the object side;

only the third lens group is moved in the direction of the optical axis to perform focus adjustment;

the first lens group substantially consists of a biconvex lens, a cemented lens formed by cementing a lens having positive refractive power and a lens having negative refractive power together, and a plurality of lenses including a lens having positive refractive power and a lens having negative refractive power in this order from the object side;

the second lens group includes a cemented lens formed by cementing a lens having positive refractive power and a lens having negative refractive power together;

the third lens group substantially consists of a single lens having a meniscus shape with a convex surface toward the object side and having negative refractive power or substantially consists of a plurality of lenses having negative refractive power, in which the absolute value of the radius of curvature of a lens surface disposed on the most image side is smaller than the absolute value of the radius of curvature of a lens surface disposed on the most object side;

the fourth lens group includes a lens having positive refractive power; and conditional expression (1) is satisfied:

$$0.7<|f3|/f<4.0.$$

This enables reduction in weight of the third lens group which is a focusing group and excellent correction of various aberrations such as spherical aberration and astigmatism as well as chromatic aberration.

Note that conditional expression (1) defines refractive power of the third lens group. By appropriately setting refractive power of the focusing group in such a manner, the amount of movement of the focusing group can be appropriately determined and aberrations due to movement of the focusing group can be accurately performed.

If the imaging lens is configured in such a manner that the value of |f3|/f exceeds the upper limit defined by conditional expression (1), refractive power will be weak and the amount of movement of the third lens group when performing focus adjustment will increase. In contrast, if the imaging lens is configured in such a manner that the value of |f3|/f is lower than the lower limit defined by conditional expression (1), aberration of field curvature will be more likely to be over-corrected (excessively corrected)(there will be a high possibility of over-correction).

BRIEF DESCRIPTION OF THE DRAWINGS

FIG. 8 is a schematic cross section illustrating the configuration of an imaging lens in Example 7;

FIG. 9B shows aberrations diagrams of the imaging lens of Example 1 (REFERENCE);

FIG. 9C shows aberrations diagrams of the imaging lens of Example 1 (MOD);

FIG. 10A shows aberrations diagrams of the imaging lens of Example 2 (INF);

FIG. 10C shows aberrations diagrams of the imaging lens of Example 2 (MOD);

FIG. 11A shows aberrations diagrams of the imaging lens of Example 3 (INF);

FIG. 12C shows aberrations diagrams of the imaging lens of Example 4 (MOD);

FIG. 13A shows aberrations diagrams of the imaging lens of Example 5 (INF);

FIG. 13C shows aberrations diagrams of the imaging lens of Example 5 (MOD);

FIG. 14B shows aberrations diagrams of the imaging lens of Example 6 (REFERENCE);

FIG. 14C shows aberrations diagrams of the imaging lens of Example 6 (MOD);

FIG. 15B shows aberrations diagrams of the imaging lens of Example 7 (REFERENCE);

FIG. 15C shows aberrations diagrams of the imaging lens of Example 7 (MOD);

DESCRIPTION OF THE PREFERRED EMBODIMENTS

Hereinafter, an imaging lens of the present invention and an imaging apparatus using the imaging lens will be described with reference to drawings.

Figure 1:
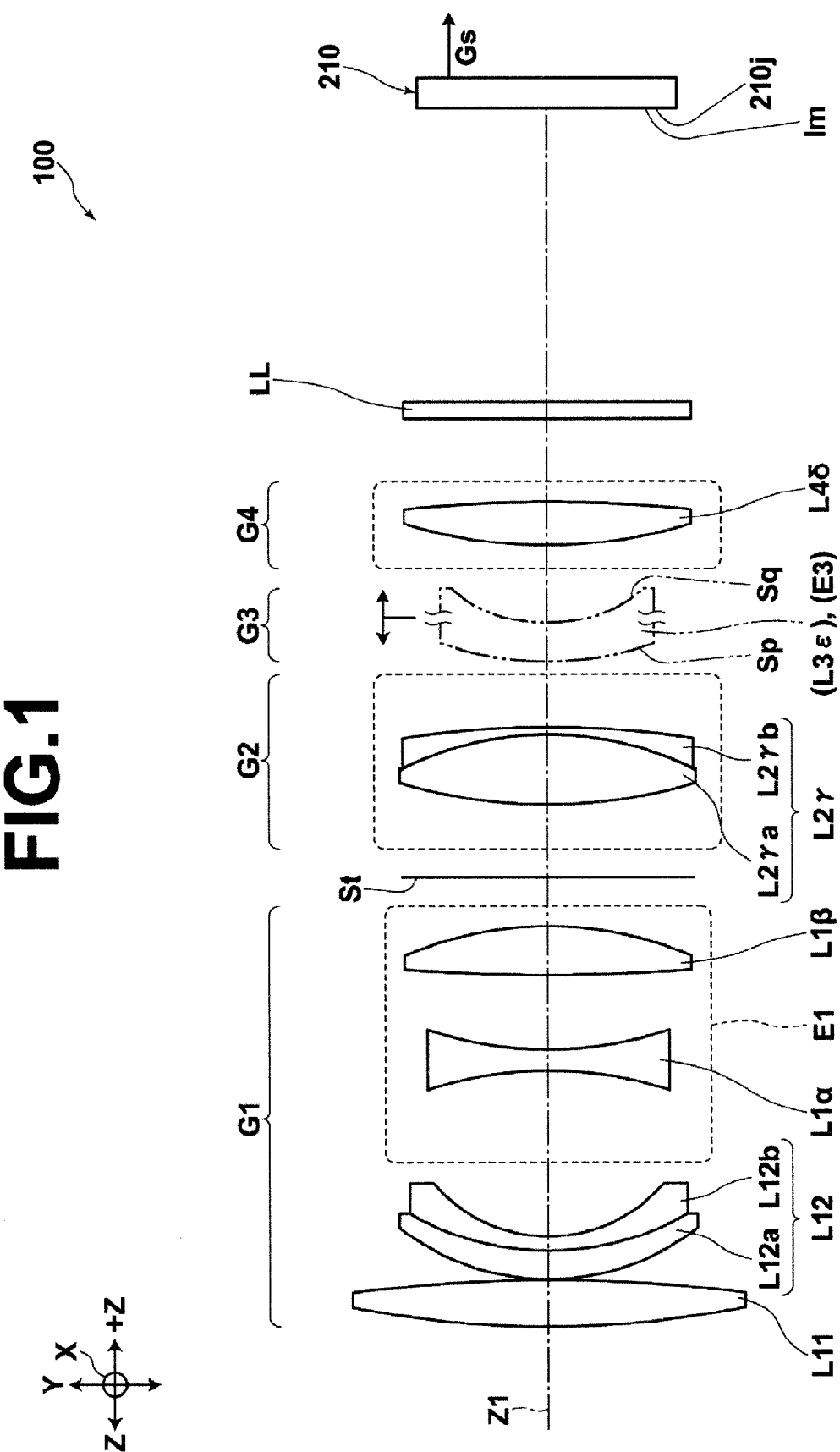
FIG. 1 is a schematic cross section illustrating the configuration of an imaging lens according to embodiments of the present invention.

FIG. 1 is a schematic cross section illustrating the configuration of an imaging lens of the present invention. In FIG. 1, arrows X, Y, Z indicate three directions orthogonal to each other in a similar manner to arrows X, Y, Z in drawings that will be described later. The direction of arrow Z indicates the same direction as optical axis Z1.

Note that a lens having positive refractive power is referred to as a positive lens, a lens having negative refractive power is referred to as a negative lens, a lens group having positive refractive power is referred to as a positive lens group, and a lens group having negative refractive power is referred to as a lens group having a negative lens group in the description given below.

An imaging lens 100 illustrated in FIG. 1 consists of four lens groups in which a negative first lens group G1, an aperture stop St, a positive second lens group G2, a negative third lens group G3, and a positive fourth lens group G4 are arranged in this order from the object side. This imaging lens 100 performs focus adjustment by moving only the third lens group G3 in the direction of the optical axis, which adopts an inner focus method to perform focusing from an object point at infinity to an object point at the closest distance.

Further, an imaging device 210 illustrated in FIG. 1 converts optical image Im representing a subject 1, and which has been formed on a light receiving surface 210j of the imaging element 210 through the imaging lens 100, into electrical signals, and outputs image signals Gs representing this optical image Im.

Note that the optical element LL without refractive power, such as a cover glass, a low-pass filter and an infrared-ray-cut filter, may be arranged between the imaging lens 100 and the imaging device 210.

The first lens group G1 substantially consists of a first group-first lens L11 which is composed of a biconvex lens, a first group-second lens L12 which is a cemented lens constituted by a positive lens L12a and a negative lens L12b, and a plurality of lenses including at least one or more a positive lens and at least one or more negative lens in this order from the object side. Note that the aforementioned plurality of lenses are indicated as the symbol E1, the one or more negative lenses included in the plurality of lenses E1 are indicated as the symbol L1α, and the one or more positive lenses included in the plurality of lenses E1 are designated as the symbol L1β.

The second lens group G2 is configured to include at least a cemented lens L2γ constituted by a positive lens L2γa and a negative lens L2γb.

The third lens group G3 is configured to be a single lens (which is indicated as the symbol L3ε in the Figure) having a meniscus shape with a convex surface toward the object side and having negative refractive power. Alternatively, this third lens group G3 is configured to consist of a plurality of lenses (which are indicated as the symbol E3 in the Figure) having negative refractive power as a whole, in which the absolute value of a radius of curvature of a lens surface Sq disposed on the most image side is smaller than the absolute value of a radius of curvature of a lens surface Sp disposed on the most object side.

The fourth lens group G4 includes at least a positive lens L4δ.

Furthermore, this imaging lens 100 satisfies conditional expression (1): $0.7 < |f3|/f < 4.0$. In this case, f3 is the focal length of the third lens group G3 and f is the focal length of the entire lens system in a state focused on an object point at infinity.

It is desirable for this imaging lens 100 to satisfy conditional expression (1'): $1.0<|f3|/f<3.0$, and it is more desirable for conditional expression (1"): $1.2<|f3|/f<2.0$ to be satisfied.

It is desirable for the imaging lens 100 to satisfy conditional expression (2): $0.6<|f1|/f<18.0$, it is more desirable for conditional expression (2'): $1.2<|f1|/f<10.0$ to be satisfied, and it is much more desirable for conditional expression (2"): $2.5<|f1|/f<4.5$ to be satisfied. In this case, f1 is the focal length of the first lens group G1.

This conditional expression (2) defines refractive power of the first lens group G1. By setting a range of the refractive power in such a manner, various aberrations such as field curvature, coma aberration can be corrected.

If the imaging lens 100 is configured in such a manner that the value of $|f1|/f$ exceeds the upper limit defined by conditional expression (2), field curvature aberration will be more inclined to be over-corrected (excessive correction). Furthermore, a lens diameter on the most object side will be large and the weight of the lens will be increased as well. In contrast, if the imaging lens 100 is configured in such a manner that the value of $|f1|/f$ is lower than the lower limit defined by conditional expression (2), field curvature aberration will be more inclined to be under-corrected (insufficient correction). Furthermore, coma aberration will not be sufficiently suppressed.

It is desirable for the imaging lens 100 to satisfy conditional expression (3): $0.2<f2/f<5.0$, it is more desirable for conditional expression (3'): $0.5<f2/f<3.5$ to be satisfied, and it is much more desirable for conditional expression (3"): $0.8<f2/f<1.2$ to be satisfied. In this case, f2 is the focal length of the second lens group G2.

Conditional expression (3) defines refractive power of the second lens group G2. By setting a range of refractive power in such a manner, spherical aberration and chromatic aberration can be corrected and excellent optical performance can be secured.

If the value of $f2/f$ exceeds the upper limit defined conditional expression (3), spherical aberration will be more inclined to be over-corrected and chromatic aberration will be insufficiently corrected. In contrast, if the value of $f2/f$ is lower than the lower limit defined conditional expression (3), spherical aberration will be more inclined to be under-corrected and chromatic aberration will be excessively corrected.

Further, it is desirable for the imaging lens 100 to satisfy conditional expression (4): $0.8<f4/f<8.0$, it is more desirable for conditional expression (4'): $1.0<f4/f<4.0$ to be satisfied, and it is much more desirable for conditional expression (4"): $1.3<f4/f<1.8$ to be satisfied.

In this case, f4 is the focal length of the fourth lens group G4.

Conditional expression (4) defines refractive power of the fourth lens group G4. By setting a range of refractive power in such a manner, occurrence of spherical aberration can be suppressed.

If the value of $f4/f$ exceeds the upper limit defined conditional expression (4), spherical aberration will be more inclined to be over-corrected. In contrast, if the value of $f4/f$ is lower than the lower limit defined conditional expression (4), spherical aberration will be more inclined to be under-corrected.

It is desirable for the imaging lens 100 to satisfy conditional expression (5): $0.5<(R3f+R3r)/(R3f-R3r)<6.0$, it is more desirable for conditional expression (5'): $1.0<(R3f+R3r)/(R3f-R3r)<4.5$ to be satisfied, and it is much more desirable for conditional expression (5"): $1.3<(R3f+R3r)/(R3f-R3r)<2.5$ to be satisfied. In this case, R3f is a radius of curvature of the lens surface Sp disposed on the most object side of the third lens group G3, and R3r is a radius of curvature of the lens surface Sq disposed on the most image side of the third lens group G3.

Conditional expression (5) defines a lens shape of a focusing group. If conditional expression (5) is not within the range, it will be difficult to correct field curvature aberration.

That is, if the imaging lens 100 is configured in such a manner that the value of $(R3f+R3r)/(R3f-R3r)$ exceeds the upper limit defined by conditional expression (5), field curvature aberration will be more inclined to be insufficiently corrected and be under-corrected (insufficient correction). In contrast, if the imaging lens 100 is configured in such a manner that the value of $(R3f+R3r)/(R3f-R3r)$ is lower than the lower limit defined by conditional expression (5), field curvature aberration will be more inclined to be excessively corrected and to be over-corrected (excessive correction).

It is desirable for at least one of a positive lens and a negative lens that constitute a cemented lens included in the first lens group G1 to satisfy conditional expression (6): $22.0<|vd(1P)-vd(1N)|$. In this case, it is more desirable for the imaging lens 100 to satisfy conditional expression (6'): $35.0<|vd(1P)-vd(1N)|$, it is much more desirable for conditional expression (6"): $50.0<|vd(1P)-vd(1N)|$ to be satisfied. Further, it is more desirable for the imaging lens 100 to satisfy conditional expression (6'''): $vd(1P)-vd(1N)<-22.0$ than to satisfy conditional expression (6): $22.0<|vd(1P)-vd(1N)|$, and even more desirable for the imaging lens 100 to satisfy conditional expression (6''''):

$$vd(1P)-vd(1N)<-35.0.$$

In this case, $vd(1P)$ is the Abbe number of the positive lens which constitutes the cemented lens, and $vd(1N)$ is the Abbe number of the negative lens which constitutes the cemented lens above.

Conditional expression (6) defines the Abbe number of a cemented lens constituted by a positive lens and a negative lens together in the first lens group G1. This conditional expression (6) is related to correcting lateral chromatic aberration and for the purpose of obtaining excellent optical performance when white light passes through the imaging lens.

If the value of $|vd(1P)-vd(1N)|$ is lower than the lower limit defined by conditional expression (6), lateral chromatic aberration will not be sufficiently corrected and lateral chromatic aberration with respect to light with a short wavelength will be more inclined to be over-corrected (excessive correction) in a region where a height of an image is tall.

In the case that a positive lens is disposed on the most image side in the first lens group G1 (for example, this positive lens is designated as a positive lens L1β), it is desirable for the imaging lens 100 to be configured in such a manner that a cemented lens in the second lens group G2 satisfies conditional expression (7): $20.0<|vd(2P)-vd(2N)|$ and a the positive lens L1β disposed on the most image side in the first lens group G1 satisfies conditional expression (8): $vd(1R)<35.0$. In this case, the cemented lens is constituted by a positive lens and a negative lens together, between which the absolute value of the difference of the Abbe numbers is the greatest, among cemented lenses included in the second lens group G2.

Here, the phrase "a cemented lens in which the difference of the Abbe numbers between a positive lens and a negative lens is the greatest" has the same meaning as the phrase "a cemented lens in which the absolute value of the difference of the Abbe numbers between a lens disposed on the object side and a lens disposed on image side is the greatest".

It is more desirable for the imaging lens 100 to satisfy conditional expression (7'): 32.0<|vd(2P)−vd(2N)|, and it is much more desirable for conditional expression (7''): 48.0<|vd(2P)−vd(2N)| to be satisfied.

It is more desirable for this imaging lens 100 to satisfy conditional expression (8'): vd(1R)<30.0.

Conditional expressions (7) and (8) are related to correction of longitudinal chromatic aberration and are for the purpose of obtaining excellent optical performance when white light passes through the imaging lens 100.

If the value of |vd(2P)−vd(2N)| is lower than the lower limit defined by conditional expression (7), longitudinal chromatic aberration will not be sufficiently corrected and the longitudinal chromatic aberration with respect to light with a long wavelength will be more inclined to be over-corrected (excessive correction). Further, if the value of vd(1R) exceeds the upper limit defined by conditional expression (8), secondary chromatic aberration will occur.

EXAMPLES

Next, Examples 1 through 7 which show data regarding specific numerical values of the imaging lens according to the present invention will be collectively described with reference to FIGS. 2 through 8, FIGS. 9A, 9B, 9C through FIGS. 15A, 15B, 15C, FIG. 16, Tables 1A, 1B through Tables 7A, 7B, and Table 8. In FIGS. 2 through 8, the same signs as the signs used in FIG. 1, which illustrates the imaging lens 100, represent constituent elements corresponding to the constituent elements in FIG. 1.

The configuration of the lens systems shown in FIGS. 2 through 8 illustrates a state when the system is focused on an object at infinity.

Example 1

Figure 2:
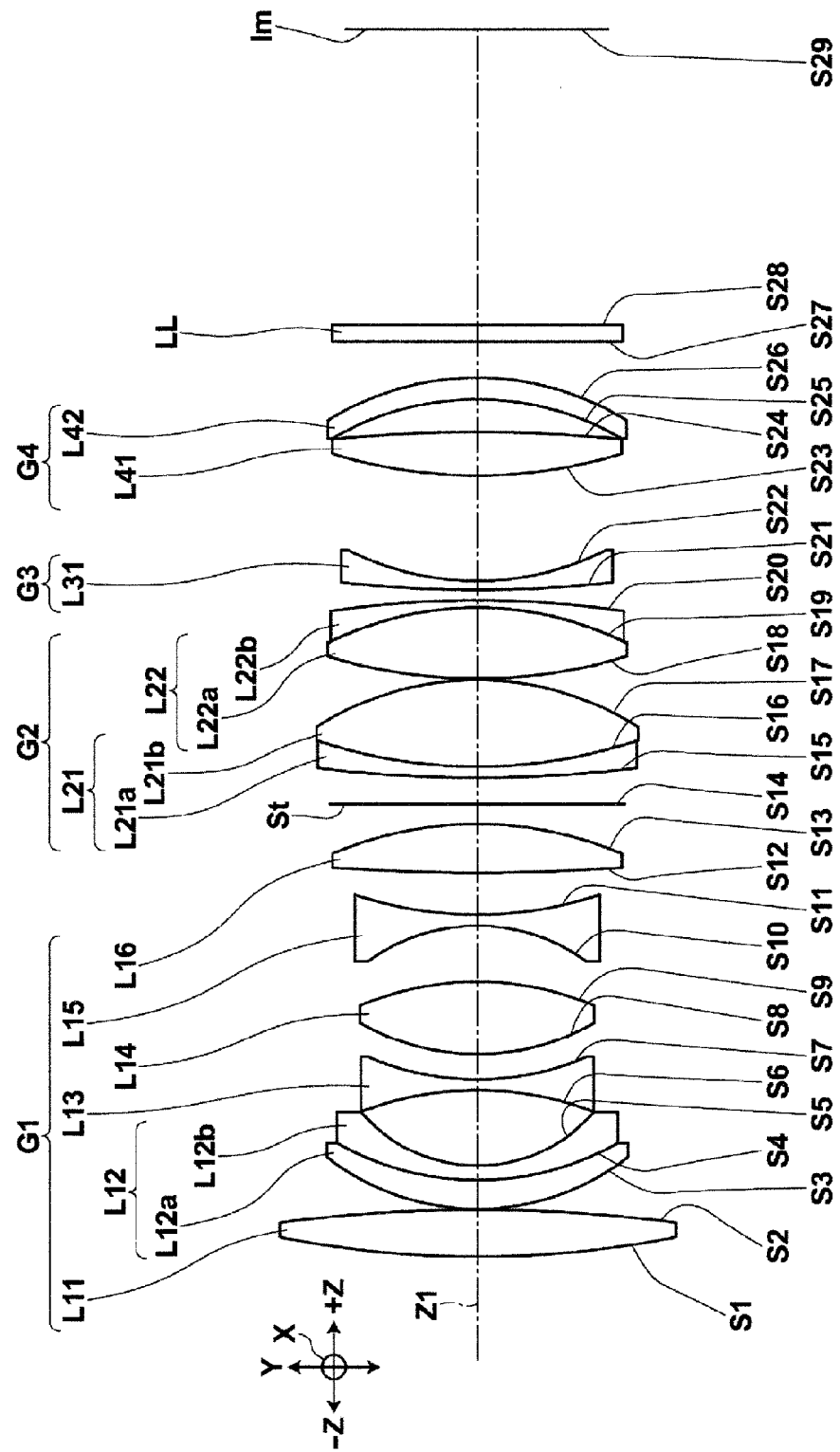
FIG. 2 is a schematic cross section illustrating the configuration of an imaging lens in Example 1.

FIG. 2 is a schematic cross section illustrating the configuration of an imaging lens in Example 1 in a state focused on an object point at infinity.

The imaging lens of Example 1 is configured to satisfy all of the aforementioned conditional expressions.

Table 1A shows lens data about the imaging lens in Example 1. In the lens data shown in Table 1A, surface number i shows the surface number of i-th surface Si (i=1, 2, 3 . . . ) that sequentially increases toward the image side, and the surface number of a surface arranged on the most object side is the first surface. In the lens data of Table 1A, surface numbers are assigned to surfaces including also aperture stop St, optical element LL without refractive power, and an image formation plane on which optical image Im is formed.

In Table 1A, sign Ri represents a curvature radius of an i-th surface (i=1, 2, 3 . . . ), and sign Di represents a surface distance between the i-th surface (i=1, 2, 3 . . . ) and an (i+1)th surface on optical axis Z1. The number of "i" in sign Ri and sign Di corresponds to the number of "i" in sign Si (i= 1, 2, 3 . . . ) representing a lens surface, an aperture stop or the like.

Further, sign ndj in Table 1A represents a refractive index for d-line (wavelength is 587.6 nm) of a j-th optical element (j=1, 2, 3 . . . ) that sequentially increases toward the image side, and the optical element arranged on the most object side is the first optical element. Sign vdj represents an Abbe number of the j-th optical element for d-line.

Specification in Table 1B shows values for a focal length of an entire lens system: f', F-number: FNo. and full angle of view: 2ω).

The numerical values written in Tables 1A, 1B through Tables 7A, 7B are normalized values so that the focal length of the entire lens system focused on an object at infinity is 1.0. Further, the curvature radius is positive when a surface is convex toward the object side, and the curvature radius is negative when a surface is convex toward the image side.

TABLE 1A

Example 1 Lens Data

| Surface Number i | Radius of Curvature Ri | Distance Between Surfaces Di | ndj | vdj |
|---|---|---|---|---|
| 1 | 2.3132 | 0.11 | 1.77186 | 50.80 |
| 2 | −3.5042 | 0.00 | | |
| 3 | 0.5546 | 0.07 | 1.84666 | 23.78 |
| 4 | 0.6433 | 0.03 | 1.49700 | 81.50 |
| 5 | 0.3480 | 0.17 | | |
| 6 | −0.7450 | 0.02 | 1.64437 | 34.00 |
| 7 | 0.6239 | 0.06 | | |
| 8 | 0.5381 | 0.17 | 1.49700 | 81.54 |
| 9 | −0.6774 | 0.13 | | |
| 10 | −0.4206 | 0.03 | 1.59552 | 39.20 |
| 11 | 0.8833 | 0.10 | | |
| 12 | 4.7486 | 0.11 | 1.84139 | 24.56 |
| 13 | −0.8303 | 0.05 | | |
| 14 | ∞ | 0.06 | | |
| (Aperture Stop) | | | | |
| 15 | 3.0802 | 0.02 | 1.63449 | 34.70 |
| 16 | 1.1460 | 0.20 | 1.49700 | 81.54 |
| 17 | −0.6762 | 0.00 | | |
| 18 | 1.1835 | 0.16 | 1.49700 | 81.54 |
| 19 | −0.7477 | 0.02 | 1.80000 | 29.84 |
| 20 | −2.2347 | DD [20] | | |
| 21 | 2.9687 | 0.02 | 1.61340 | 44.27 |
| 22 | 0.6465 | DD [22] | | |
| 23 | 1.1236 | 0.10 | 1.49700 | 81.54 |
| 24 | −3.2209 | 0.07 | | |
| 25 | −0.6496 | 0.05 | 1.83996 | 23.00 |
| 26 | −0.6375 | 0.08 | | |
| 27 | ∞ | 0.04 | 1.51633 | 64.14 |
| 28 | ∞ | 0.65 | | |
| 29 | ∞ | | | |
| (Image Surface) | | | | |

TABLE 1B

Example 1 Specification (d-line)

| | INF | Reference | MOD |
|---|---|---|---|
| f' | 1.00 | 0.99 | 0.97 |
| FNo. | 1.90 | 1.90 | 1.90 |
| 2ω [°] | 33.6 | 33.8 | 34.2 |
| Distance Associated With Zooming | | | |
| DD [20] | 0.02 | 0.05 | 0.13 |
| DD [22] | 0.24 | 0.22 | 0.14 |

Figure 9A:
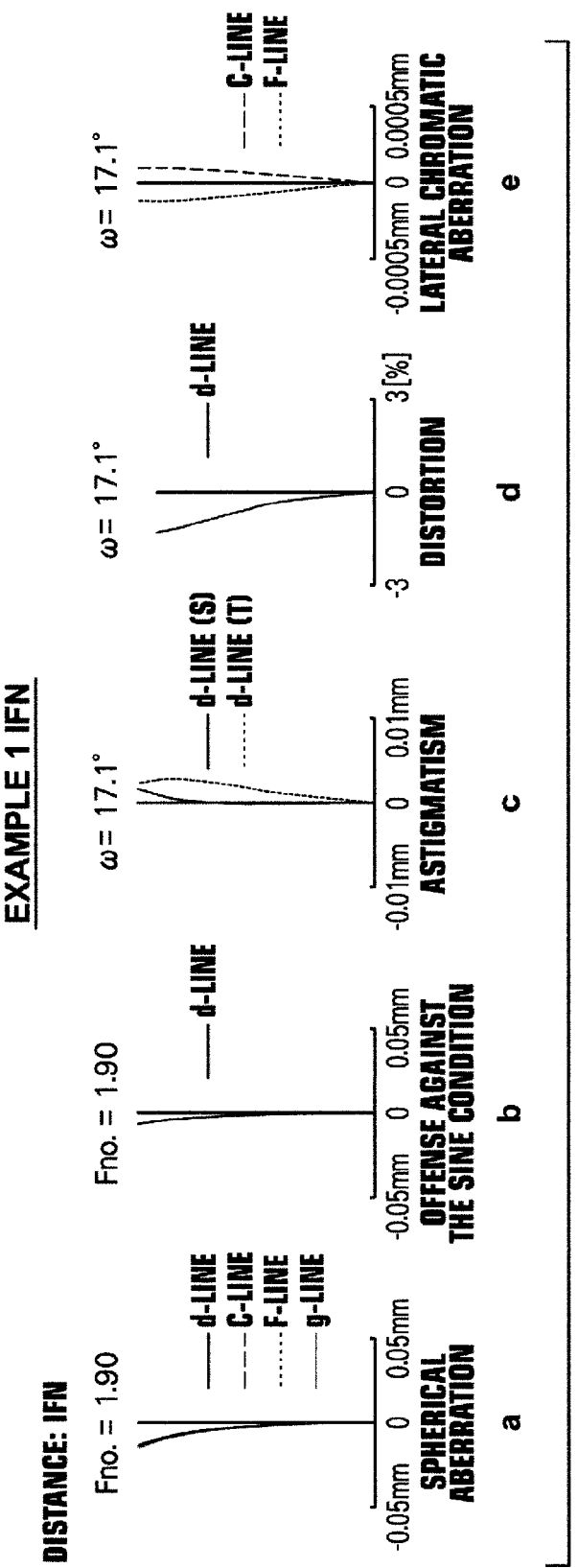
FIG. 9A shows aberrations diagrams of the imaging lens of Example 1 (INF)

FIGS. 9A, 9B, 9C respectively show aberration diagrams of the imaging lens in Example 1. FIG. 9A is a diagram illustrating various aberrations when this imaging lens is focused on an object point at infinity, FIG. 9B is a diagram illustrating various aberrations when this imaging lens is focused on an object which is positioned at a reference photographing distance of 33.28 mm, FIG. 9C is a diagram illustrating various aberrations when this imaging lens is focused on an object positioned at the shortest photographing distance (the closest distance, MOD: Minimum Object Distance) of 7.49 mm. In FIGS. 9A, 9B, 9C, a diagram shown as sign a illustrates spherical aberration, a diagram shown as sign b illustrates offense against the sine condition, a diagram shown as sign c illustrates astigmatism, a diagram shown as sign d illustrates distortion, and a diagram shown as sign e illustrates lateral chromatic aberration.

In FIGS. 9A, 9B, and 9C, various aberrations respectively with respect to light with wavelengths of d-line, C-line, F-line, and g-line.

In the diagram of astigmatism, a solid line indicates aberration in a sagittal direction, and a broken line indicates aberration in a tangential direction. Further, the numerical values on the top of the diagrams of spherical aberration and the diagram of sine condition represent an F-number, and the numerical values on the top of the other diagrams of aberrations represents a half angle of view ω.

Further, Table 8 shows values corresponding to each numerical expression in the aforementioned conditional expressions with respect to each of imaging lenses in Examples 1 through 7. The values of the numerical expressions in Table 8 are obtainable from the lens data shown in Tables 1 through 7. Table 8 will be shown at the end of descriptions about the examples.

FIG. 2 showing the configuration of the imaging lens of Example 1, FIGS. 9A, 9B, 9C illustrating aberrations, Table 1A showing lens data, Table 1B showing specification, and Table 8 showing values about each numerical expression in the conditional formulas are similar also for figures and tables about Examples 2 through 7, which will be described later. Therefore, explanations of them will be omitted with respect to the examples described hereinafter.

Example 2

Figure 3:
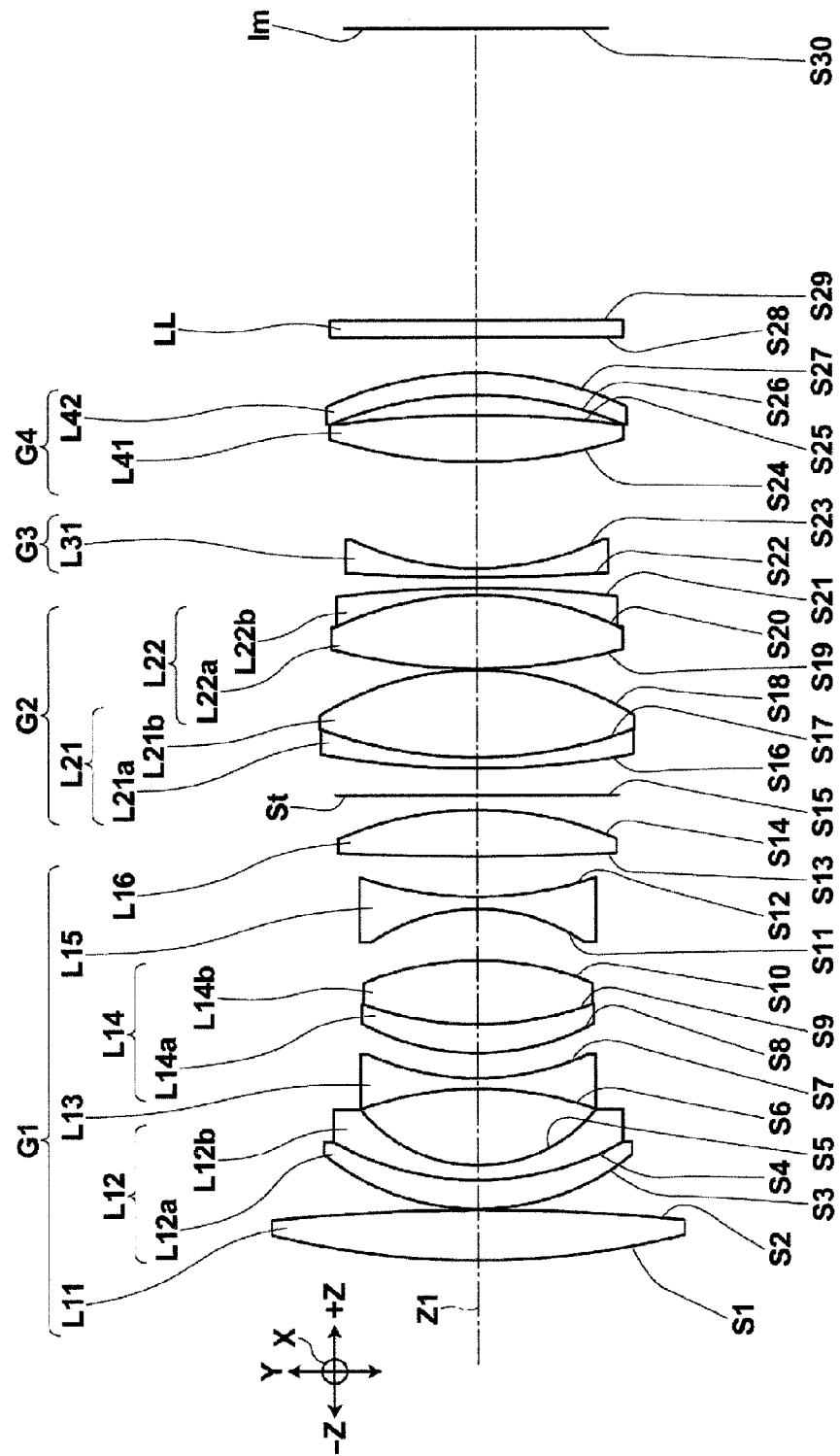
FIG. 3 is a schematic cross section illustrating the configuration of an imaging lens in Example 2.

FIG. 3 is a schematic cross section illustrating the configuration of an imaging lens in Example 2, in a state focused on an object point at infinity.

The imaging lens in Example 2 is also configured to satisfy all of the aforementioned conditional expressions.

Figure 10B:
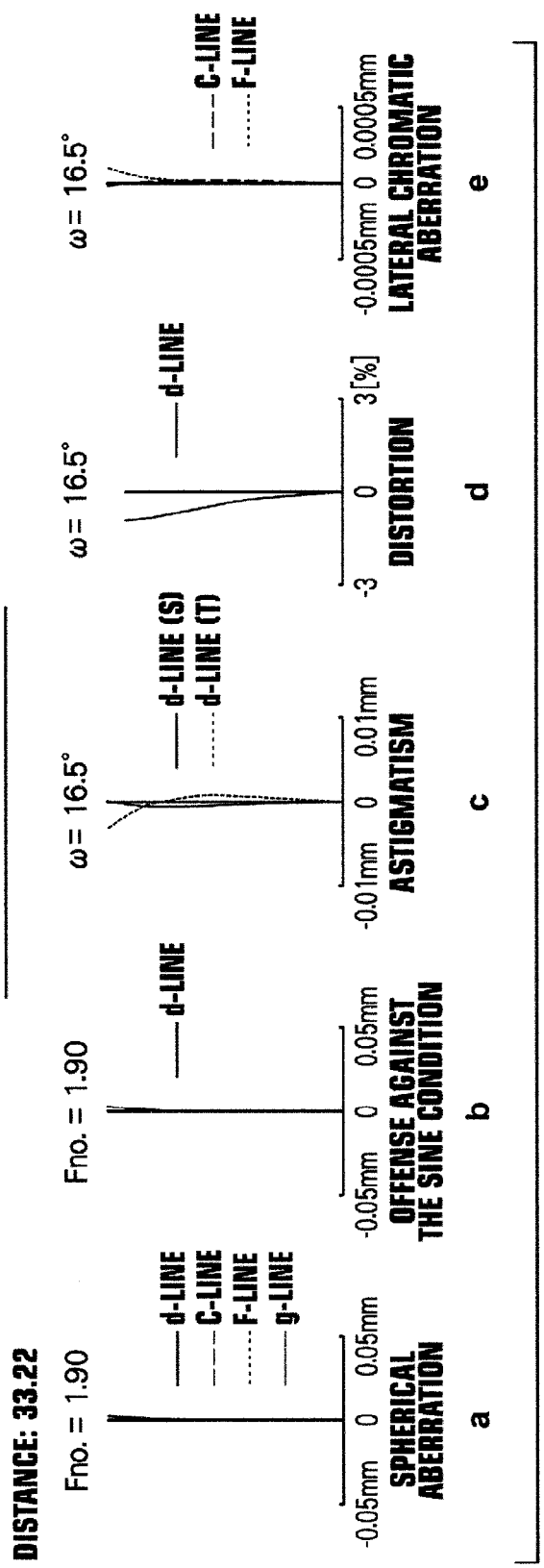
FIG. 10B shows aberrations diagrams of the imaging lens of Example 2 (REFERENCE)

FIGS. 10A, 10B, and 10C are diagrams illustrating aberrations of the imaging lens in Example 2.

The following Table 2A shows lens data about the imaging lens in Example 2. Table 2B shows specification of the imaging lens in Example 2.

TABLE 2A

Example 2 Lens Data

| Surface Number i | Radius of Curvature Ri | Distance Between Surfaces Di | ndj | νdj |
|---|---|---|---|---|
| 1 | 1.9296 | 0.12 | 1.82863 | 45.14 |
| 2 | −4.6241 | 0.00 | | |
| 3 | 0.5536 | 0.07 | 1.84666 | 23.78 |
| 4 | 0.6647 | 0.03 | 1.49700 | 81.50 |
| 5 | 0.3435 | 0.18 | | |
| 6 | −0.7994 | 0.02 | 1.70810 | 29.59 |
| 7 | 0.6038 | 0.06 | | |
| 8 | 0.5441 | 0.07 | 1.74156 | 44.32 |
| 9 | 0.7608 | 0.15 | 1.49700 | 81.54 |
| 10 | −0.6792 | 0.12 | | |
| 11 | −0.4213 | 0.03 | 1.62542 | 35.80 |
| 12 | 0.8251 | 0.09 | | |
| 13 | 6.1891 | 0.11 | 1.84666 | 23.78 |
| 14 | −0.7829 | 0.03 | | |
| 15 (Aperture Stop) | ∞ | 0.06 | | |
| 16 | 1.9847 | 0.02 | 1.57818 | 40.34 |
| 17 | 1.0077 | 0.20 | 1.49700 | 81.54 |
| 18 | −0.6680 | 0.00 | | |
| 19 | 1.2820 | 0.17 | 1.49700 | 81.54 |
| 20 | −0.7495 | 0.02 | 1.80000 | 29.84 |
| 21 | −2.5319 | DD [21] | | |
| 22 | 4.7876 | 0.02 | 1.61340 | 44.27 |
| 23 | 0.6463 | DD [23] | | |
| 24 | 1.0860 | 0.11 | 1.49700 | 81.54 |
| 25 | −2.4001 | 0.05 | | |
| 26 | −0.8529 | 0.05 | 1.82191 | 24.01 |
| 27 | −0.7962 | 0.08 | | |
| 28 | ∞ | 0.04 | 1.51633 | 64.14 |
| 29 | ∞ | 0.62 | | |
| 30 (Image Surface) | ∞ | | | |

TABLE 2B

Example 2 Specification (d-line)

| | INF | Reference | MOD |
|---|---|---|---|
| f' | 1.00 | 1.00 | 0.98 |
| FNo. | 1.90 | 1.90 | 1.90 |
| 2ω [°] | 33.6 | 33.6 | 34.0 |
| Distance Associated With Zooming | | | |
| DD [21] | 0.02 | 0.05 | 0.13 |
| DD [23] | 0.24 | 0.22 | 0.14 |

Example 3

Figure 4:
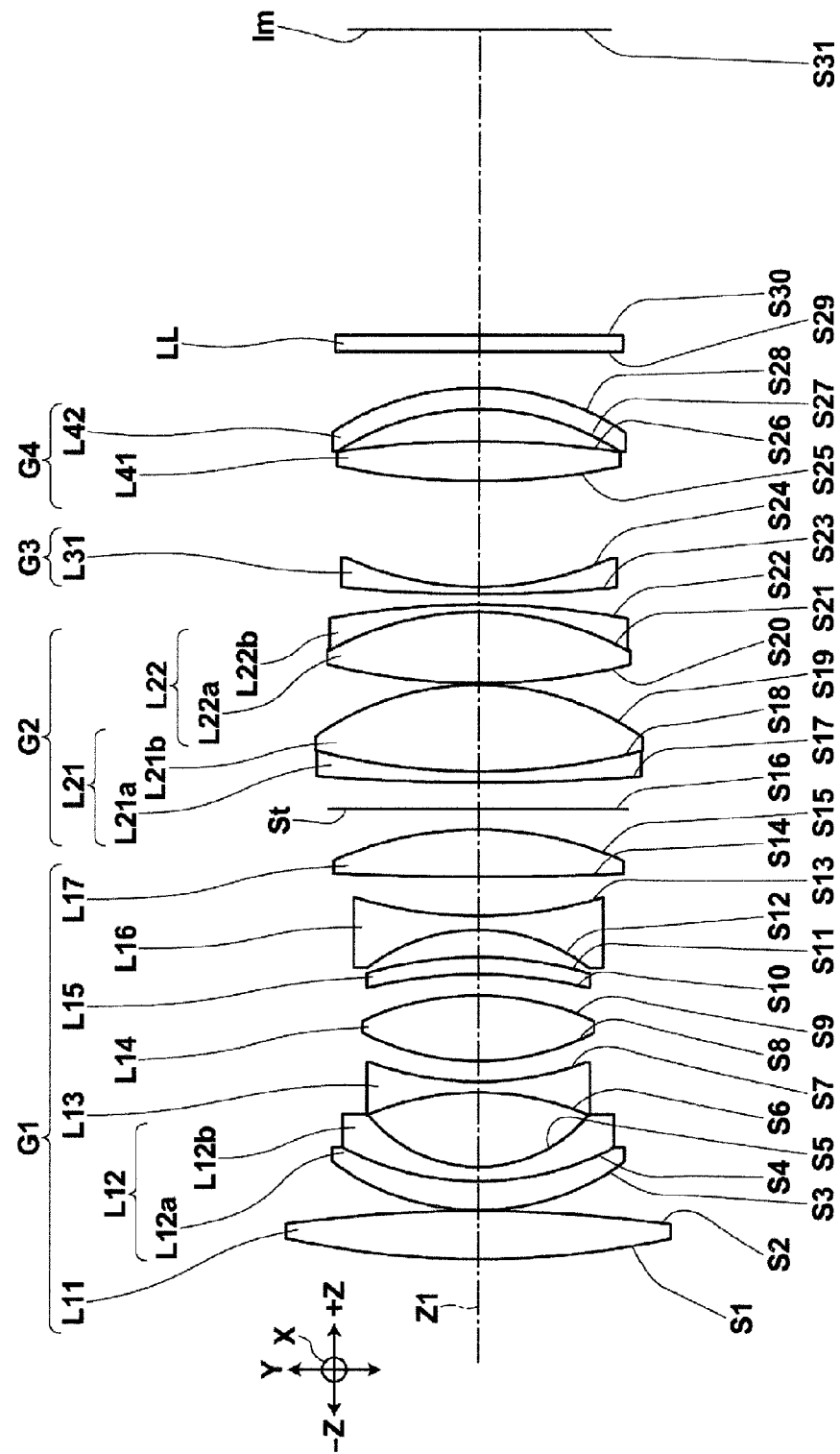
FIG. 4 is a schematic cross section illustrating the configuration of an imaging lens in Example 3.

FIG. 4 is a schematic cross section illustrating the configuration of an imaging lens in Example 3, in a state focused on an object point at infinity.

The imaging lens in Example 3 is also configured to satisfy all of the aforementioned conditional expressions.

Figure 11B:
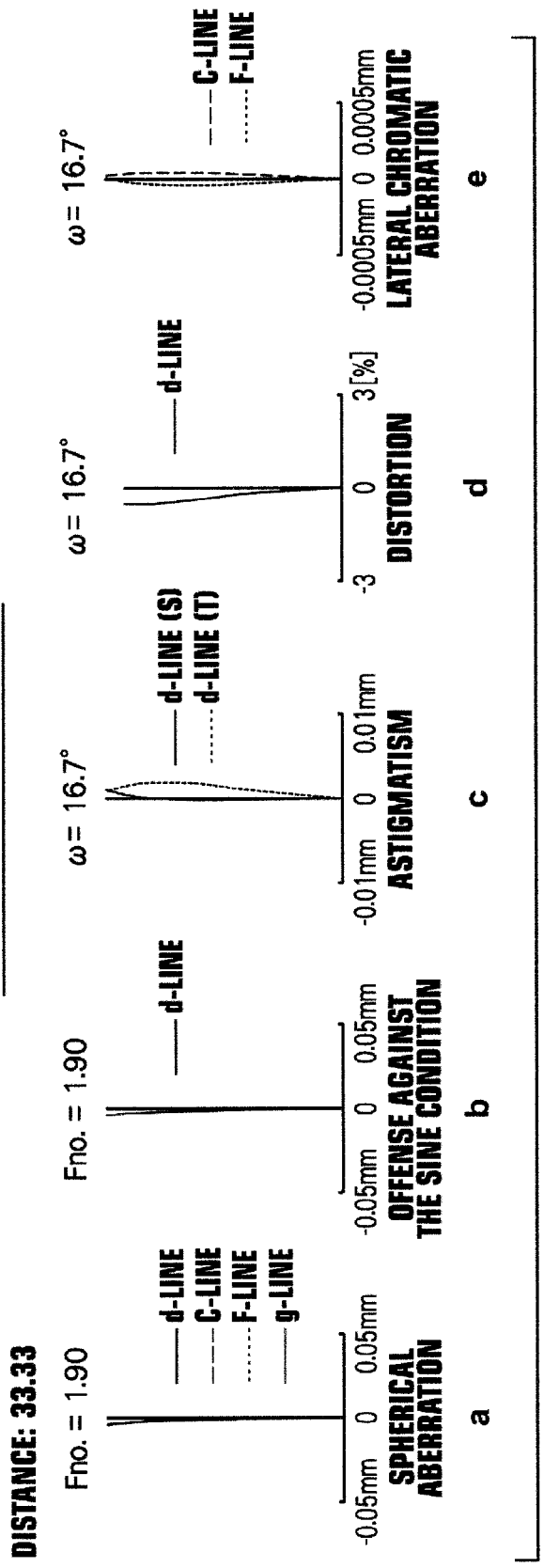
FIG. 11B shows aberrations diagrams of the imaging lens of Example 3 (REFERENCE)
Figure 11C:
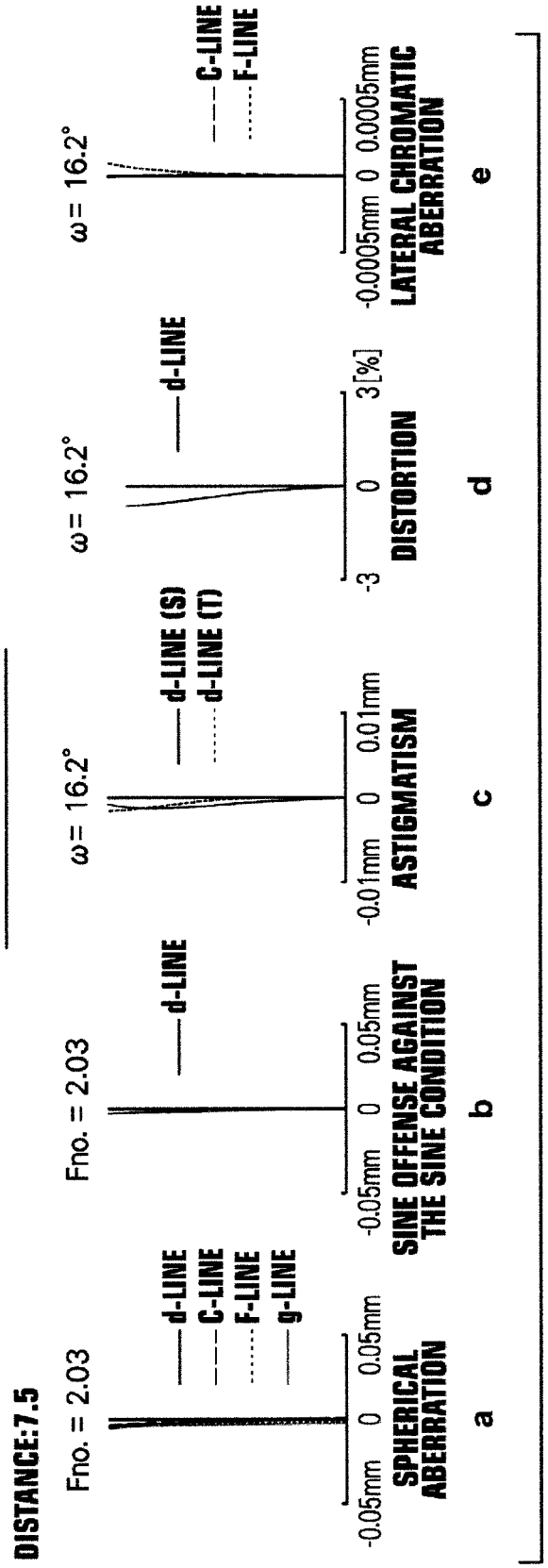
FIG. 11C shows aberrations diagrams of the imaging lens of Example 3 (MOD)

FIGS. 11A, 11B, and 11C are diagrams illustrating aberrations of the imaging lens in Example 3.

The following Table 3A shows lens data about the imaging lens in Example 3. Table 3B shows specification of the imaging lens in Example 3.

TABLE 3A

Example 3 Lens Data

| Surface Number i | Radius of Curvature Ri | Distance Between Surfaces Di | ndj | νdj |
|---|---|---|---|---|
| 1 | 2.0671 | 0.11 | 1.74100 | 52.64 |
| 2 | −3.2845 | 0.00 | | |
| 3 | 0.5555 | 0.07 | 1.84666 | 23.78 |
| 4 | 0.6574 | 0.03 | 1.49700 | 81.54 |
| 5 | 0.3263 | 0.17 | | |
| 6 | −0.6407 | 0.02 | 1.64769 | 33.79 |
| 7 | 0.7033 | 0.05 | | |
| 8 | 0.5688 | 0.15 | 1.49700 | 81.54 |
| 9 | −0.6245 | 0.05 | | |
| 10 | −1.0664 | 0.04 | 1.84001 | 33.53 |
| 11 | −0.8757 | 0.06 | | |
| 12 | −0.4117 | 0.03 | 1.62588 | 35.70 |
| 13 | 0.9669 | 0.09 | | |
| 14 | 6.9417 | 0.11 | 1.84666 | 23.78 |
| 15 | −0.8074 | 0.05 | | |
| 16 (Aperture Stop) | ∞ | 0.06 | | |
| 17 | 4.8718 | 0.02 | 1.59551 | 39.24 |
| 18 | 1.4782 | 0.20 | 1.49700 | 81.54 |
| 19 | −0.6436 | 0.00 | | |
| 20 | 1.4044 | 0.16 | 1.49700 | 81.54 |
| 21 | −0.6974 | 0.02 | 1.80000 | 29.84 |
| 22 | −1.8599 | DD [22] | | |
| 23 | 3.1531 | 0.02 | 1.61340 | 44.27 |
| 24 | 0.7245 | DD [24] | | |
| 25 | 1.5454 | 0.09 | 1.49700 | 81.54 |

TABLE 3A-continued

Example 3 Lens Data

| Surface Number i | Radius of Curvature Ri | Distance Between Surfaces Di | ndj | vdj |
|---|---|---|---|---|
| 26 | −2.1014 | 0.07 | | |
| 27 | −0.5903 | 0.05 | 1.84666 | 23.78 |
| 28 | −0.5988 | 0.08 | | |
| 29 | ∞ | 0.04 | 1.51633 | 64.14 |
| 30 | ∞ | 0.67 | | |
| 31 (Image Surface) | ∞ | | | |

TABLE 3B

Example 3 Specification (d-line)

| | INF | Reference | MOD |
|---|---|---|---|
| f′ | 1.00 | 0.99 | 0.97 |
| FNo. | 1.90 | 1.90 | 1.90 |
| 2ω [°] | 33.4 | 33.6 | 34.2 |
| Distance Associated With Zooming | | | |
| DD [22] | 0.02 | 0.05 | 0.13 |
| DD [24] | 0.24 | 0.22 | 0.13 |

Example 4

Figure 5:
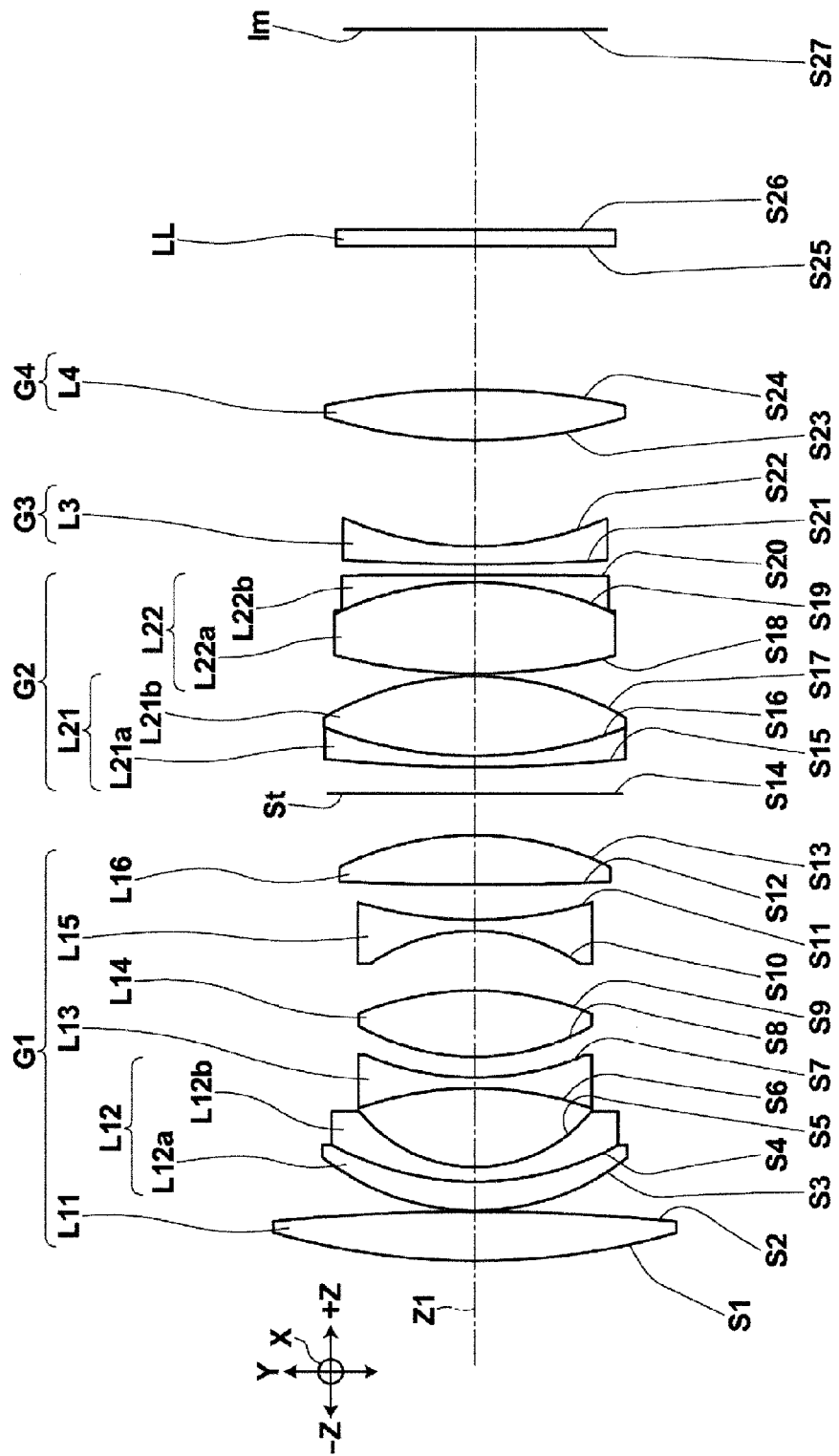
FIG. 5 is a schematic cross section illustrating the configuration of an imaging lens in Example 4.

FIG. 5 is a schematic cross section illustrating the configuration of an imaging lens in Example 4, in a state focused on an object point at infinity.

The imaging lens in Example 4 is also configured to satisfy all of the aforementioned conditional expressions.

Figure 12A:
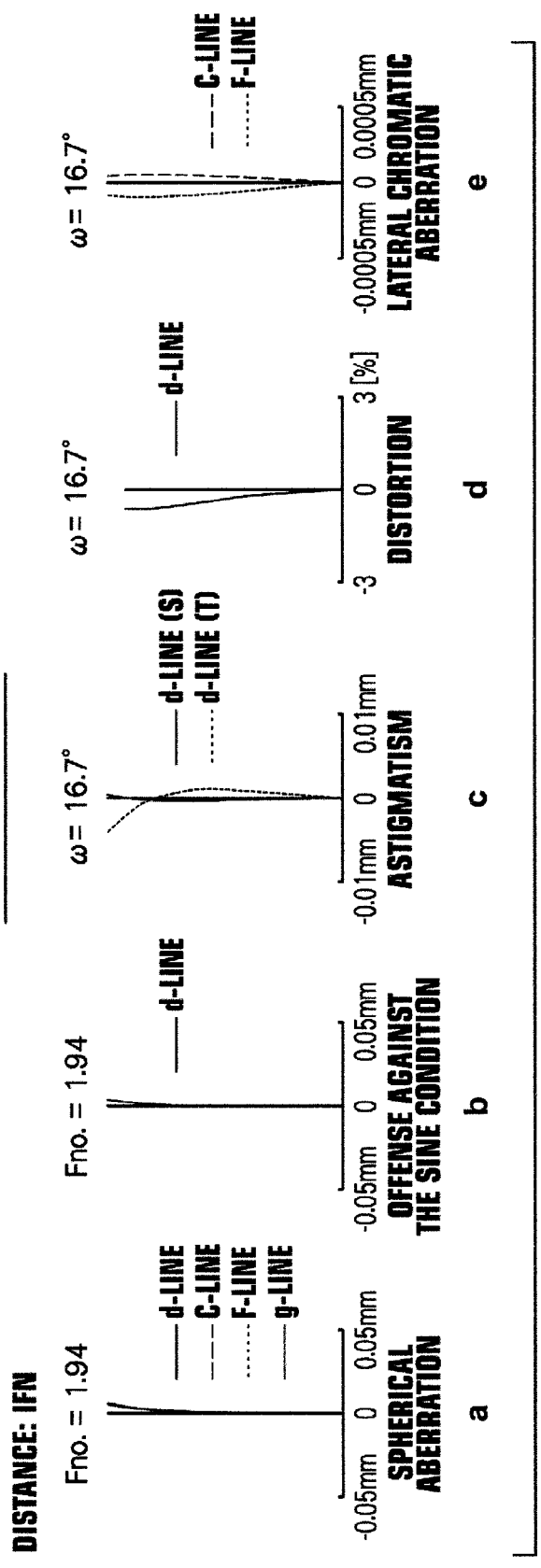
FIG. 12A shows aberrations diagrams of the imaging lens of Example 4 (INF)
Figure 12B:
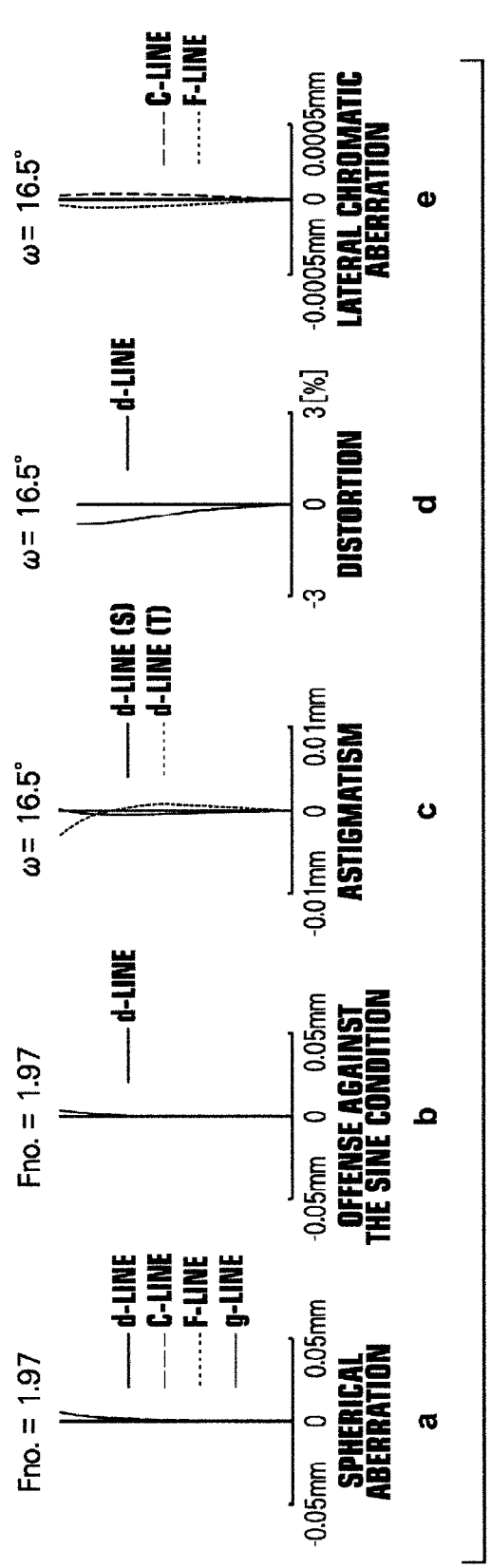
FIG. 12B shows aberrations diagrams of the imaging lens of Example 4 (REFERENCE)

FIGS. 12A, 12B, and 12C are diagrams illustrating aberrations of the imaging lens in Example 4.

The following Table 4A shows lens data about the imaging lens in Example 4. Table 4B shows specification of the imaging lens in Example 4.

TABLE 4A

Example 4 Lens Data

| Surface Number i | Radius of Curvature Ri | Distance Between Surfaces Di | ndj | vdj |
|---|---|---|---|---|
| 1 | 1.6674 | 0.11 | 1.74100 | 52.64 |
| 2 | −4.5543 | 0.00 | | |
| 3 | 0.5543 | 0.07 | 1.84666 | 23.78 |
| 4 | 0.6723 | 0.03 | 1.49700 | 81.54 |
| 5 | 0.3354 | 0.18 | | |
| 6 | −0.7868 | 0.02 | 1.72151 | 29.23 |
| 7 | 0.6359 | 0.05 | | |
| 8 | 0.5338 | 0.15 | 1.49700 | 81.54 |
| 9 | −0.6846 | 0.14 | | |
| 10 | −0.4169 | 0.03 | 1.63980 | 34.46 |
| 11 | 0.9238 | 0.08 | | |
| 12 | 6.9710 | 0.11 | 1.84666 | 23.78 |
| 13 | −0.6821 | 0.09 | | |
| 14 (Aperture Stop) | ∞ | 0.06 | | |
| 15 | 3.3145 | 0.02 | 1.51633 | 64.14 |
| 16 | 0.9277 | 0.18 | 1.49700 | 81.54 |
| 17 | −0.6681 | 0.01 | | |
| 18 | 1.2616 | 0.21 | 1.49700 | 81.54 |
| 19 | −0.7396 | 0.02 | 1.69895 | 30.13 |
| 20 | −18.0950 | DD [20] | | |
| 21 | 4.7002 | 0.04 | 1.61340 | 44.27 |
| 22 | 0.7293 | DD [22] | | |
| 23 | 1.1381 | 0.12 | 1.49700 | 81.54 |
| 24 | −1.5788 | 0.33 | | |

TABLE 4A-continued

Example 4 Lens Data

| Surface Number i | Radius of Curvature Ri | Distance Between Surfaces Di | ndj | vdj |
|---|---|---|---|---|
| 25 | ∞ | 0.04 | 1.51633 | 64.14 |
| 26 | ∞ | 0.42 | | |
| 27 (Image Surface) | ∞ | | | |

TABLE 4B

Example 4 Specification (d-line)

| | INF | Reference | MOD |
|---|---|---|---|
| f′ | 1.00 | 1.00 | 0.98 |
| FNo. | 1.90 | 1.90 | 1.90 |
| 2ω [°] | 33.4 | 33.6 | 33.8 |
| Distance Associated With Zooming | | | |
| DD [20] | 0.02 | 0.06 | 0.16 |
| DD [22] | 0.24 | 0.21 | 0.11 |

Example 5

Figure 6:
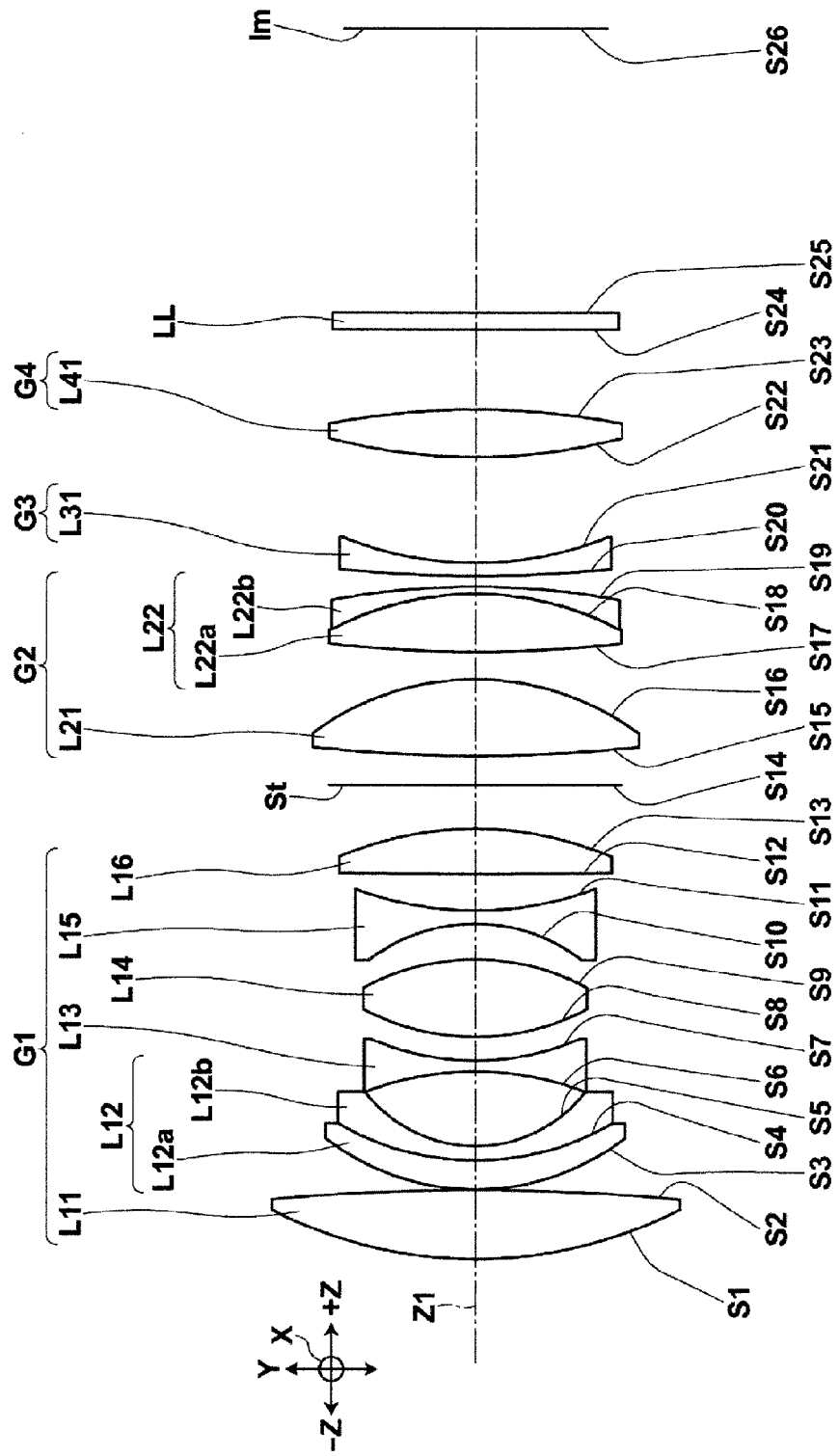
FIG. 6 is a schematic cross section illustrating the configuration of an imaging lens in Example 5.

FIG. 6 is a schematic cross section illustrating the configuration of an imaging lens in Example 5, in a state focused on an object point at infinity.

The imaging lens in Example 5 is also configured to satisfy all of the aforementioned conditional expressions.

Figure 13B:
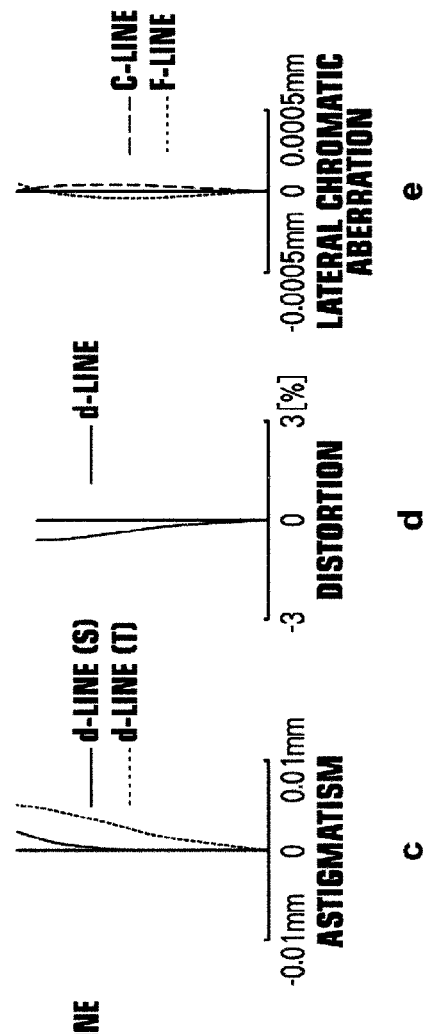
FIG. 13B shows aberrations diagrams of the imaging lens of Example 5 (REFERENCE)

FIGS. 13A, 13B, and 13C are diagrams illustrating aberrations of the imaging lens in Example 5.

The following Table 5A shows lens data about the imaging lens in Example 5. Table 5B shows specification of the imaging lens in Example 5.

TABLE 5A

Example 5 Lens Data

| Surface Number i | Radius of Curvature Ri | Distance Between Surfaces Di | ndj | vdj |
|---|---|---|---|---|
| 1 | 1.0151 | 0.16 | 1.60543 | 60.95 |
| 2 | −5.1050 | 0.00 | | |
| 3 | 0.5543 | 0.07 | 1.84666 | 23.78 |
| 4 | 0.6172 | 0.03 | 1.49700 | 81.54 |
| 5 | 0.3163 | 0.17 | | |
| 6 | −0.6886 | 0.02 | 1.69568 | 30.31 |
| 7 | 0.5930 | 0.05 | | |
| 8 | 0.5523 | 0.18 | 1.49700 | 81.54 |
| 9 | −0.5336 | 0.08 | | |
| 10 | −0.3957 | 0.03 | 1.55250 | 45.16 |
| 11 | 0.7814 | 0.08 | | |
| 12 | 21.5279 | 0.10 | 1.84666 | 23.78 |
| 13 | −0.7912 | 0.10 | | |
| 14 (Aperture Stop) | ∞ | 0.07 | | |
| 15 | 3.4309 | 0.18 | 1.49700 | 81.54 |
| 16 | −0.6197 | 0.06 | | |
| 17 | 2.9163 | 0.13 | 1.49700 | 81.54 |
| 18 | −0.6995 | 0.02 | 1.83898 | 26.02 |
| 19 | −1.7620 | DD [19] | | |
| 20 | 3.1118 | 0.03 | 1.61340 | 44.27 |
| 21 | 0.8053 | DD [21] | | |

TABLE 5A-continued

Example 5 Lens Data

| Surface Number i | Radius of Curvature Ri | Distance Between Surfaces Di | ndj | vdj |
|---|---|---|---|---|
| 22 | 1.2995 | 0.11 | 1.49700 | 81.54 |
| 23 | −1.7479 | 0.18 | | |
| 24 | ∞ | 0.04 | 1.51633 | 64.14 |
| 25 | ∞ | 0.65 | | |
| 26 (Image Surface) | ∞ | | | |

TABLE 5B

Example 5 Specification (d-line)

| | INF | Reference | MOD |
|---|---|---|---|
| f' | 1.00 | 1.00 | 0.98 |
| FNo. | 1.90 | 1.90 | 1.90 |
| 2ω [°] | 33.4 | 33.4 | 33.8 |
| Distance Associated With Zooming | | | |
| DD [19] | 0.02 | 0.06 | 0.19 |
| DD [21] | 0.24 | 0.21 | 0.08 |

Example 6

Figure 7:
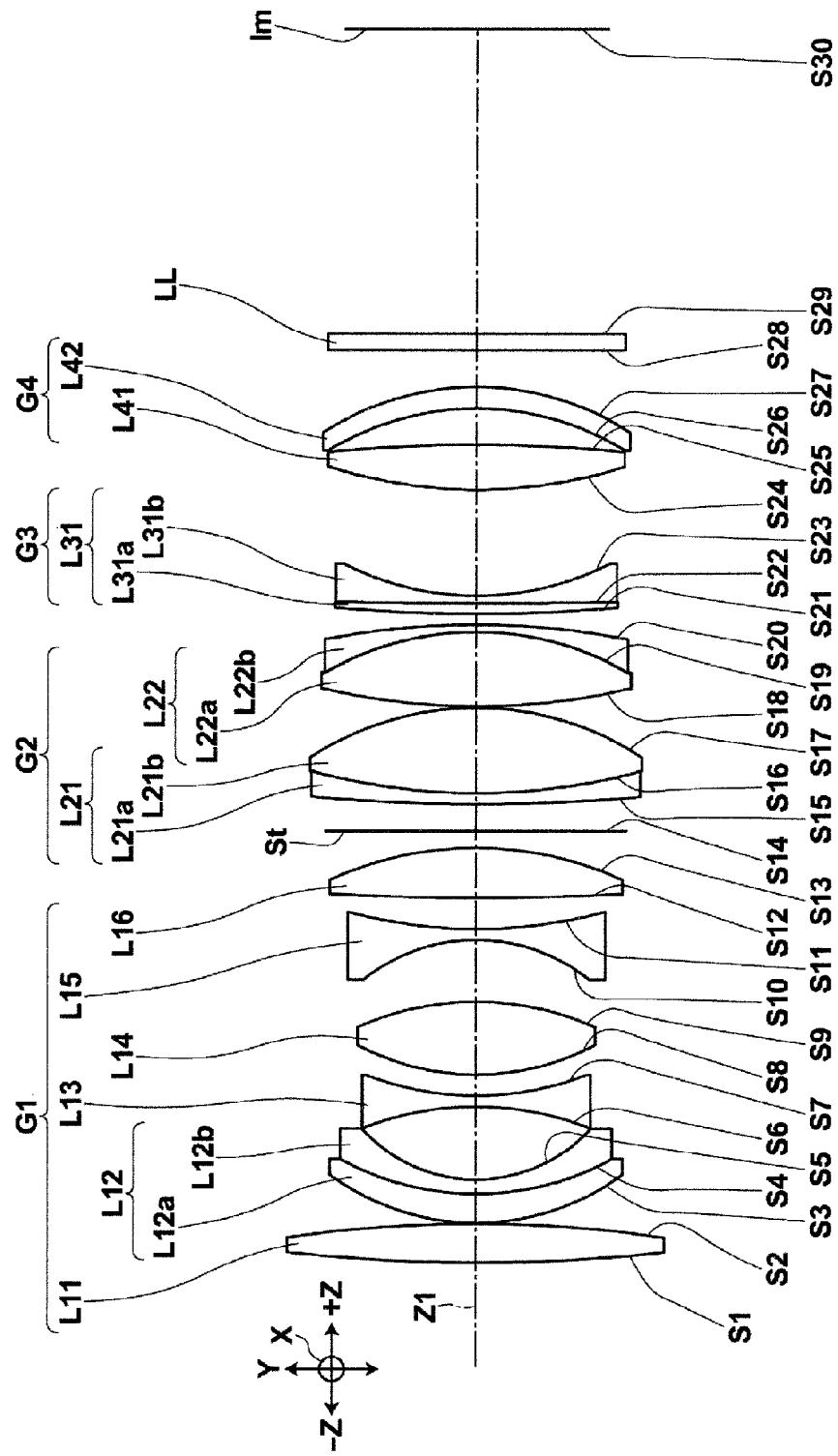
FIG. 7 is a schematic cross section illustrating the configuration of an imaging lens in Example 6.

FIG. 7 is a schematic cross section illustrating the configuration of an imaging lens in Example 6, in a state focused on an object point at infinity.

The imaging lens in Example 6 is also configured to satisfy all of the aforementioned conditional expressions.

Figure 14A:
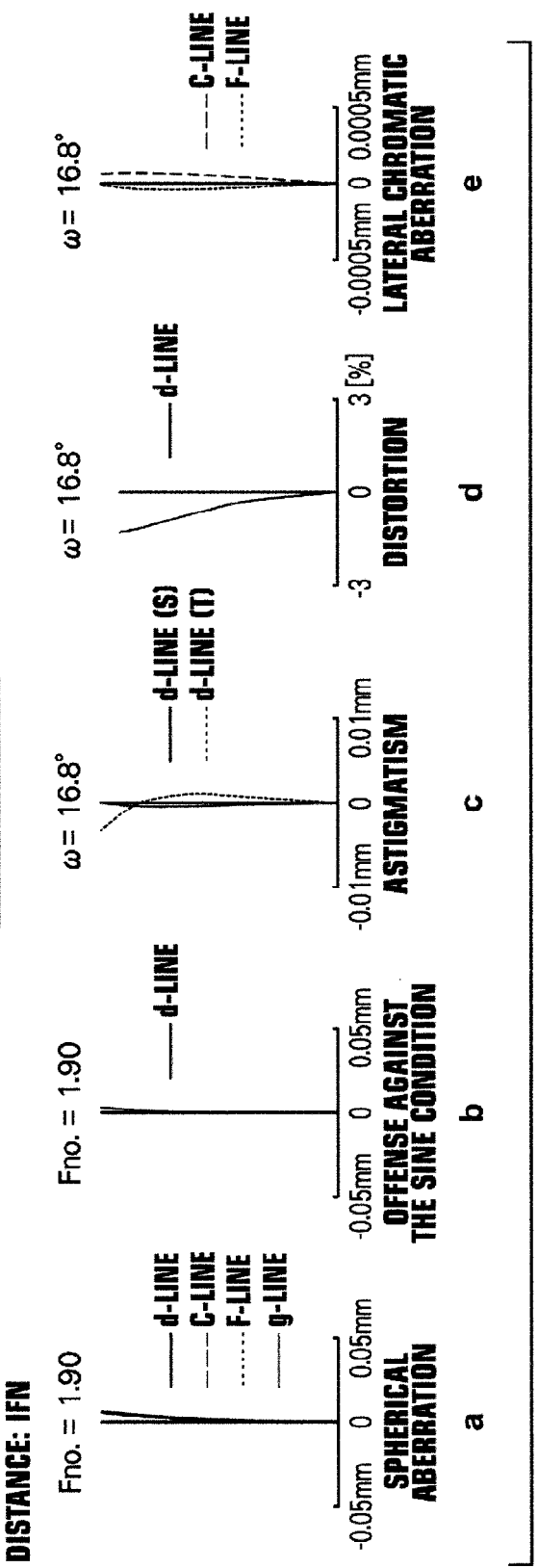
FIG. 14A shows aberrations diagrams of the imaging lens of Example 6 (INF)

FIGS. 14A, 14B, and 14C are diagrams illustrating aberrations of the imaging lens in Example 6.

The following Table 6A shows lens data about the imaging lens in Example 6. Table 6B shows specification of the imaging lens in Example 6.

TABLE 6A

Example 6 Lens Data

| Surface Number i | Radius of Curvature Ri | Distance Between Surfaces Di | ndj | vdj |
|---|---|---|---|---|
| 1 | 3.9089 | 0.09 | 1.84001 | 44.00 |
| 2 | −2.8861 | 0.00 | | |
| 3 | 0.5558 | 0.07 | 1.84666 | 23.78 |
| 4 | 0.6375 | 0.03 | 1.49700 | 81.50 |
| 5 | 0.3503 | 0.17 | | |
| 6 | −0.6921 | 0.02 | 1.63618 | 34.56 |
| 7 | 0.6840 | 0.05 | | |
| 8 | 0.5739 | 0.17 | 1.49700 | 81.54 |
| 9 | −0.6581 | 0.15 | | |
| 10 | −0.4096 | 0.03 | 1.62588 | 35.68 |
| 11 | 1.1230 | 0.07 | | |
| 12 | 6.2401 | 0.11 | 1.84139 | 24.56 |
| 13 | −0.7867 | 0.04 | | |
| 14 (Aperture Stop) | ∞ | 0.06 | | |
| 15 | 4.1193 | 0.02 | 1.49999 | 55.00 |
| 16 | 1.3994 | 0.20 | 1.49700 | 81.54 |
| 17 | −0.6804 | 0.00 | | |
| 18 | 1.5116 | 0.17 | 1.49700 | 81.54 |
| 19 | −0.6851 | 0.02 | 1.80000 | 29.84 |
| 20 | −1.7754 | DD [20] | | |
| 21 | 3.5797 | 0.02 | 1.83564 | 30.08 |
| 22 | 28.5420 | 0.02 | 1.59233 | 38.77 |
| 23 | 0.6584 | DD [23] | | |
| 24 | 1.0927 | 0.10 | 1.49700 | 81.54 |
| 25 | −3.4397 | 0.08 | | |

TABLE 6A-continued

Example 6 Lens Data

| Surface Number i | Radius of Curvature Ri | Distance Between Surfaces Di | ndj | vdj |
|---|---|---|---|---|
| 26 | −0.6402 | 0.05 | 1.83990 | 23.13 |
| 27 | −0.6332 | 0.08 | | |
| 28 | ∞ | 0.04 | 1.51633 | 64.14 |
| 29 | ∞ | 0.68 | | |
| 30 (Image Surface) | ∞ | | | |

TABLE 6B

Example 6 Specification (d-line)

| | INF | Reference | MOD |
|---|---|---|---|
| f' | 1.00 | 1.00 | 0.98 |
| FNo. | 1.90 | 1.90 | 1.90 |
| 2ω [°] | 33.8 | 33.8 | 34.2 |
| Distance Associated With Zooming | | | |
| DD [20] | 0.02 | 0.05 | 0.14 |
| DD [23] | 0.24 | 0.22 | 0.12 |

Example 7

FIG. 8 is a schematic cross section illustrating the configuration of an imaging lens in Example 7, in a state focused on an object point at infinity.

The imaging lens in Example 7 is also configured to satisfy all of the aforementioned conditional expressions.

Figure 15A:
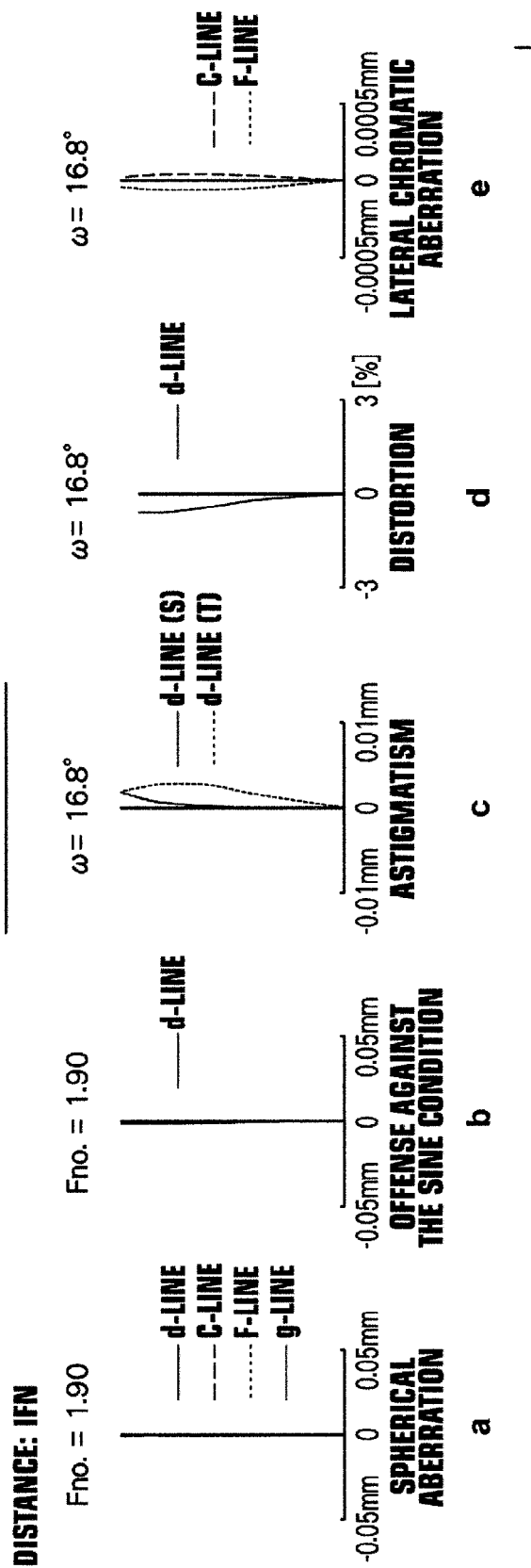
FIG. 15A shows aberrations diagrams of the imaging lens of Example 7 (INF)

FIGS. 15A, 15B, and 15C are diagrams illustrating aberrations of the imaging lens in Example 7.

The following Table 7A shows lens data about the imaging lens in Example 7. Table 7B shows specification of the imaging lens in Example 7.

TABLE 7A

Example 7 Lens Data

| Surface Number i | Radius of Curvature Ri | Distance Between Surfaces Di | ndj | vdj |
|---|---|---|---|---|
| 1 | 1.5836 | 0.12 | 1.80400 | 46.58 |
| 2 | −6.7494 | 0.00 | | |
| 3 | 0.5667 | 0.07 | 1.84666 | 23.78 |
| 4 | 0.6825 | 0.03 | 1.49700 | 81.54 |
| 5 | 0.3431 | 0.17 | | |
| 6 | −0.9150 | 0.02 | 1.72825 | 28.46 |
| 7 | 0.6406 | 0.06 | | |
| 8 | 0.5538 | 0.15 | 1.49700 | 81.54 |
| 9 | −0.7688 | 0.17 | | |
| 10 | −0.4235 | 0.03 | 1.64769 | 33.79 |
| 11 | 0.9241 | 0.08 | | |
| 12 | 6.5442 | 0.11 | 1.84666 | 23.78 |
| 13 | −0.6883 | 0.16 | | |
| 14 (Aperture Stop) | ∞ | 0.06 | | |
| 15 | 9.8633 | 0.15 | 1.49700 | 81.54 |
| 16 | −0.6336 | 0.00 | | |
| 17 | 1.3272 | 0.15 | 1.49700 | 81.54 |
| 18 | −0.7001 | 0.02 | 1.68893 | 31.07 |
| 19 | −23.4572 | DD [19] | | |
| 20 | 2.2516 | 0.02 | 1.79999 | 41.18 |
| 21 | 1.6080 | 0.02 | 1.64216 | 48.66 |
| 22 | 0.8316 | DD [22] | | |
| 23 | 1.2131 | 0.09 | 1.49700 | 81.54 |
| 24 | −2.1885 | 0.14 | | |
| 25 | ∞ | 0.04 | 1.51633 | 64.14 |

TABLE 7A-continued

Example 7 Lens Data

| Surface Number i | Radius of Curvature Ri | Distance Between Surfaces Di | ndj | vdj |
|---|---|---|---|---|
| 26 | ∞ | 0.66 | | |
| 27 (Image Surface) | ∞ | | | |

TABLE 7B

Example 7 Specification (d-line)

| | INF | Reference | MOD |
|---|---|---|---|
| f | 1.00 | 1.00 | 0.98 |
| FNo. | 1.90 | 1.90 | 1.90 |
| 2ω [°] | 33.4 | 33.4 | 33.8 |
| Distance Associated With Zooming | | | |
| DD [19] | 0.02 | 0.07 | 0.21 |
| DD [22] | 0.24 | 0.20 | 0.06 |

The following Table 8 shows data with respect to conditional expressions as described above.

TABLE 8

| Expression Numbers | Numerical Expressions/Items in Conditional Expressions | Example 1 | Example 2 | Example 3 | Example 4 | Example 5 | Example 6 | Example 7 | min | max |
|---|---|---|---|---|---|---|---|---|---|---|
| | f | 1.00 | 1.00 | 1.00 | 1.00 | 1.00 | 1.00 | 1.00 | 1.00000 | 1.00000 |
| (1) | |f1|/f | 4.06 | 3.41 | 3.83 | 3.93 | 2.72 | 2.91 | 4.24 | 2.72000 | 4.24000 |
| (2) | f2/f | 0.86 | 0.81 | 0.86 | 0.94 | 0.91 | 0.86 | 1.01 | 0.81000 | 1.01000 |
| (3) | |f3|/f | 1.37 | 1.22 | 1.54 | 1.41 | 1.74 | 1.49 | 1.97 | 1.22000 | 1.97000 |
| (4) | f4/f | 1.59 | 1.37 | 1.78 | 1.35 | 1.49 | 1.58 | 1.59 | 1.35000 | 1.78000 |
| (5) | (R3f + R3r)/(R3f − R3r) | 1.56 | 1.31 | 1.60 | 1.37 | 1.70 | 1.45 | 2.17 | 1.31000 | 2.17000 |
| (6) | |vd(1P) − vd(1N)| | 57.72 | 57.72 | 57.76 | 57.76 | 57.76 | 57.72 | 57.76 | 57.72000 | 57.76000 |
| (7) | |vd(2P) − vd(2N)| | 51.70 | 51.70 | 51.70 | 51.41 | 55.52 | 51.70 | 50.47 | 50.47000 | 55.52000 |
| (8) | vd(1R) | 24.56 | 23.78 | 23.78 | 23.78 | 23.78 | 24.56 | 23.78 | 23.78 | 24.56 |

MINIMUM RANGE
2.5 < |f1|/f < 4.5 . . . (1)
0.8 < f2/f < 1.2 . . . (2)
1.2 < |f3|/f < 2.0 . . . (3)
1.3 < f4/f < 1.8 . . . (4)
1.3 < (R3f + R3r)/(R3f − R3r) < 2.5 . . . (5)
22.0 < |vd(1P) − vd(1N)| . . . (6)
20.0 < |vd(2P) − vd(2N)| . . . (7)
vd(1R) < 35.0 . . . (8)

Examples 1 through 7 will be described in detail below with reference to Example 1 in particular as a representative example.

First, the imaging lens of Example 1 will be described with reference to FIG. 2.

As shown in FIG. 2, the imaging lens in Example 1 consists of four lenses in which a first lens group G1 having negative refractive power, an aperture stop St, a second lens group G2 having positive refractive power, a third lens group G3 having negative refractive power, and a fourth lens group G4 having positive refractive power are arranged in this order from the object side; only the third lens group G3 moves in the direction of the optical axis to perform focusing.

The first lens group G1 consists of a biconvex lens L11, a cemented lens constituted by a positive meniscus lens L12a with a convex surface toward the object side and a negative meniscus lens L12b with a convex surface toward the object side together, a biconcave lens L13, a biconvex lens L14, a biconcave lens L15, and a biconvex lens L16 with a surface having a smaller absolute value of a radius of curvature toward the image side in this order from the object side; and has negative refractive power as a whole.

The second lens group G2 consists of a cemented lens L21 having positive refractive power, constituted by a negative meniscus lens L21a with a convex surface toward the object side and a biconvex lens L21b, and a cemented lens L22 having positive refractive power as a whole, constituted by a biconvex lens L22a and a meniscus lens L22b with a concave surface toward the object side in this order from the object side; and has positive refractive power as a whole.

The third lens group G3 consists of only a negative meniscus lens L31 with a convex surface toward the object side.

The fourth lens group G4 consists of a biconvex lens L41 with a surface having a smaller absolute value of a radius of curvature toward the object side and a meniscus lens L42 having positive refractive power (weak positive refractive power) with a concave surface toward the object side in this order from the object side; and has positive refractive power as a whole.

Three lenses L11, L12a, and L12b which are disposed from the most object side in the first lens group G1 are quite similar to a lens configuration disposed on the object side from a stop in the Gauss type lens system judging from their shapes. However, the three lenses L11, L12a, L12b are set in such a manner that the Abbe numbers thereof have the relationship of large-small-large thereamong. This design concept differs from that of the Gauss type lens system corresponding thereto in that the Abbe numbers of three lenses in the Gauss type lens system are set to have the relationship of large-large-small thereamong.

In the Gauss type lens system, lenses disposed on the object side from the stop corrects spherical aberration, field curvature, and astigmatism to a certain degree, and a configuration in which lenses are symmetrically disposed with the stop therebetween corrects coma aberration and distortion.

In the configuration to the third lens from the most object side in the imaging lens in Example 1 according to the present invention, an abnormal-dispersion glass that is a high-refractive-index high-dispersion glass is used for a positive meniscus lens L12a which is the second lens from the most object side, and an abnormal-dispersion glass that is a low-refractive-index low-dispersion glass is used for a negative meniscus lens L12b which is the third lens from the most object side. These configurations enable cancelling lateral chromatic aberration and secondary chromatic aberration which occur in the following group, and differ from a Gauss-type configuration in that coma aberration is corrected by the first lens group G1 independently.

A concave lens L13 which is the fourth lens and a convex lens L14 which is the fifth lens are in a form of disassembly of a cemented lens constituted by a fourth lens and a fifth lens in the Gauss type lens system. Refractive power of each of the aforementioned concave lens L13 and a convex lens L14 is stronger (greater) than the general Gauss type lens system. Further, these lenses function in a slightly different manner than the fourth and fifth lenses in the general Gauss type lens system. A high-dispersion glass is used for the aforementioned fourth lens L13 and a super-low-dispersion glass is used for the fifth lens L14, and chromatic aberration which occurs at this portion is excessively corrected. The following sixth and seventh lenses are configured in such a manner that a moderate-dispersion glass is used for the sixth negative lens L15 and a high-dispersion glass is used for the seventh positive lens L16, so that chromatic aberration occurs. In the entire first lens group G1 (singular), longitudinal chromatic aberration is insufficiently corrected and lateral chromatic aberration is substantially corrected.

An image-side surface S5 of a lens L12b which is the third lens, a lens L13 which is the fourth lens, and a lens L15 which is the sixth lens mainly function as an aberration correction lens for spherical aberration. However, field curvature is excessively corrected due to such a lens function.

The second lens group G2 consists of a cemented lens L21 constituted by a negative meniscus lens L21a with a convex surface toward the object side and a biconvex lens L21b together; and a cemented lens constituted by a biconvex lens L22a and a negative meniscus lens L22b with a concave surface toward the object side together in this order from the object side.

In a cemented lens L21 and a cemented lens L22, negative meniscus lenses L21a and L22b employ a high-refractive-index high-dispersion glass, and biconvex lenses L21b and L22a employ a low-refractive-index low-dispersion glass. Thereby, longitudinal chromatic aberration and spherical aberration are corrected.

The longitudinal chromatic aberration generated in the second lens group G2 is excessively corrected and is cancelled by the relationship between the first lens group G1 and the second lens group G2. Lateral chromatic aberration is corrected by the second lens group G2 independently. Field curvature is not sufficiently corrected by the second group G2 alone, but is cancelled by the relationship between the first lens group G1 and the second lens group G2.

The third lens group G3 consists of a single negative meniscus lens L31 with a convex surface toward the object side and moves toward the image side while focusing from infinity to the close distance. By configuring the third lens group G3 to be a lens having such a meniscus shape, fluctuations in spherical aberration due to focusing can be suppressed. In the third lens group G3, both spherical aberration and field curvature are over-corrected.

The value of |f3|/f in conditional expression (1) is 1.37. By setting refractive power in such a manner, the amount of movement of the third lens group while focusing from infinity to the close distance falls within an appropriate range. The third lens group G3 is light because a lens which moves while focusing is single.

The fourth lens group G4 consists of a biconvex lens L41 with a convex surface toward the object side, of which the absolute value of a radius of curvature is small, and a meniscus lens L42 having positive refractive power (extremely weak positive refractive power) with a concave surface toward the object side in this order from the object side.

A biconvex lens L41 effectively increases refractive power of the entire lens system and realizes a fast lens (small FNo.). The fourth lens group G4 generates spherical aberration. The spherical aberration generated by the fourth lens group G4 is canceled between the third lens group G3 and the fourth lens group G4.

A meniscus lens L42 having positive refractive power (weak positive refractive power) effectively corrects spherical aberration, coma aberration, astigmatism, and distortion.

The configuration in which the first lens group G1 is negative and the second lens group G2 is positive with the aperture stop St therebetween exhibits advantageous effects of reducing an angle of marginal rays which enter the third lens group G3, and can reduce fluctuations in the angle of view due to focusing.

As described above, according to the imaging lens of Example 1 of the present invention, an imaging lens with high performance, a light focusing group, and reduced fluctuations in the angle of view due to focusing can be realized.

Next, the imaging lens of Example 2 will be described with reference to FIG. 3.

The configuration of the imaging lens of Example 2 is in common with (the same as) the configuration of the imaging lens of Example 1 except for a point that a biconvex lens L14 (refer to FIG. 2) which is the fifth lens in the imaging lens of Example 1 is changed to a lens formed by cementing a positive meniscus lens L14a with a convex surface toward the object side and a biconvex lens L14b together. In this case, by using a glass material which has high refractive index with respect to a lens with a sharp convex surface, field curvature can be advantageously corrected.

Next, the imaging lens of Example 3 will be described with reference to FIG. 4.

The configuration of the imaging lens of Example 3 is in common with (the same as) the configuration of the imaging lens of Example 1 except for a point that a positive meniscus lens L15 with a concave surface toward the object side (having weak refractive power) is additionally disposed adjacent to a lens L14 (refer to FIG. 2) which is the fifth lens in the imaging lens of Example 1. This added positive meniscus lens L15 has advantageous effects from the viewpoint of finely correcting spherical aberration, coma aberration, field curvature, and the like.

Next, the imaging lens of Example 4 will be described with reference to FIG. 5.

The configuration of the imaging lens of Example 4 is in common with (the same as) the configuration of the imaging lens of Example 1 except for a point that a meniscus lens L42 disposed on the most image side of the imaging lens of Example 1 is eliminated. As this meniscus lens L42 is eliminate, correction of a radius of curvature, and the like are administered on the other lenses. The optical performance of the imaging lens of Example 4 is not as superior as the optical performance of the imaging lens of Example 1 due to spherical aberration, coma aberration, field curvature, astigmatism, distortion, and the like, but is sufficient enough to achieve the purposes.

Next, the imaging lens of Example 5 will be described with reference to FIG. 6.

The configuration of the imaging lens of Example 5 is in common with (the same as) the configuration of the imaging lens of Example 4 except for a point that a cemented lens L21 (refer to FIG. 5) on the object side of the second lens group G2 of the imaging lens of Example 4 is changed to a single lens L21 (refer to FIG. 6) having positive refractive power, of which the absolute number of a radius of curvature on the image side is small. In the imaging lens of Example 5, the distance between a single lens L21 on the object side and a cemented lens L22 on the image side in the second lens group G2 is widely secured and the height of incidence of peripheral angle-of-view rays onto a bonded surface of the cemented lens L22 is high in order to suppress increase in the burden of correction of lateral chromatic aberration on the cemented lens L22 on the image side in the second lens group G2.

Next, the imaging lens of Example 6 will be described with reference to FIG. 7.

The configuration of the imaging lens of Example 6 is in common with (the same as) the configuration of the imaging lens of Example 1 except for points that a single lens L31 (refer to FIG. 2) which constitutes the third lens group G3 of the imaging lens of Example 1 is a cemented lens L31 (refer to FIG. 7) constituted by a positive lens L31a and a negative lens L31b and fluctuations in chromatic aberration while focusing is reduced.

Next, the imaging lens of Example 7 will be described with reference to FIG. 8.

The configuration of the imaging lens configuration in Example 7 is in common with (the same as) that of the imaging lens in Example 5 except for a point that the third lens group G3 of the imaging lens of Example 5 is a cemented lens L31 constituted by negative lenses (a negative lens L31a and a negative lens L31b). Note that the lens data (Table 1A through Table 7A) according to each of the Examples is standardized such that the focal length of the entire lens system becomes 1. It is obvious that each imaging lens can be configured such that it is proportionally enlarged or miniaturized by multiplying the numerical values in the lens data above by an arbitrary magnification according to the size of the light receiving surface which receives light passed through the imaging lens.

Figure 16:
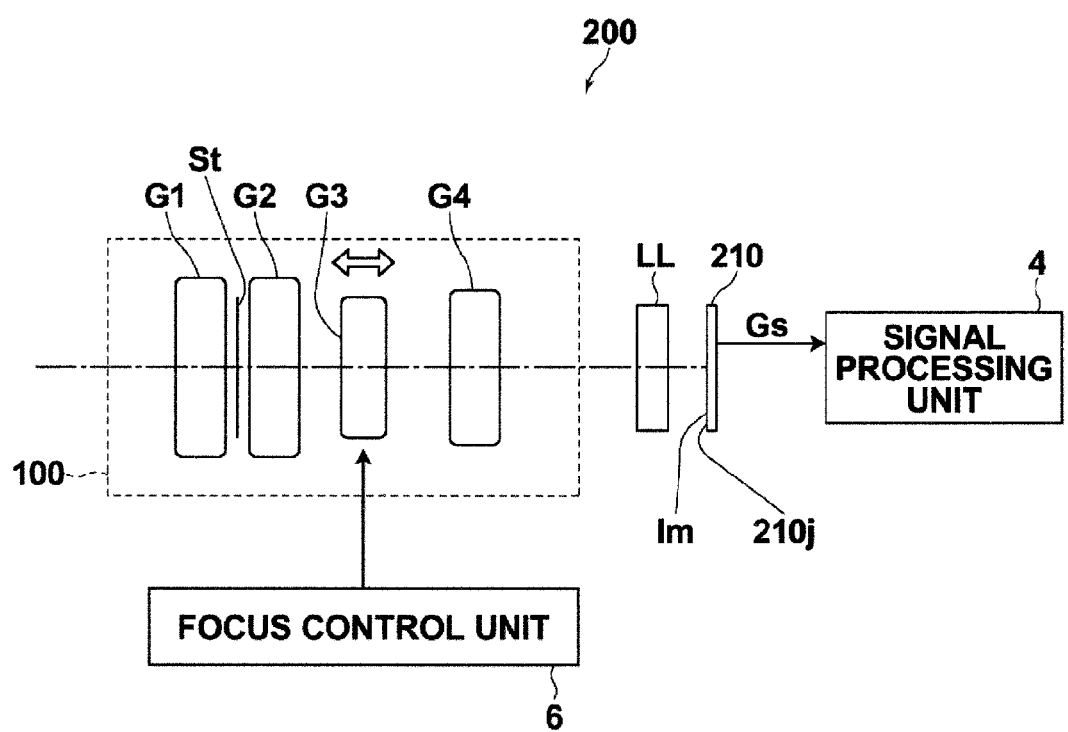
FIG. 16 is a diagram illustrating an imaging apparatus loaded with the imaging lens of the present invention.

FIG. 16 shows a schematic configuration diagram of the imaging apparatus including the imaging lens according to the embodiment of the present invention as one example of the imaging apparatus of the embodiment of the present invention. Examples of the imaging apparatus include a compact imaging lens with high performance that is usable for a digital camera, a broadcasting camera, a movie camera, and the like.

An imaging apparatus 200 shown in FIG. 16 includes an imaging lens 100, an imaging element 210 that photographs an optical image Im of a subject imaged by the imaging lens, and a signal processing section 4 which computes an image signal Gs which is an output signal representing the optical image Im from the imaging element 210. The imaging lens 100 conceptually shows each of the lens groups in which a lens group which moves while focusing is the third lens group G3. A light receiving surface 210j of the imaging element 210 is disposed so as to match the image surface of the imaging lens 100. A CCD element, a CMOS element, or the like may be employed as the imaging element 210, for example. Note that a filter LL is disposed between the imaging lens 100 and the imaging element 210.

The imaging apparatus 200 is provided with a focus control section 6 for performing focus adjustment (focusing) by moving the third lens group G3 of the imaging lens 100. Note that the imaging apparatus 200 may include a stop control section for changing an aperture diameter of the aperture stop St which is not shown in FIG. 16.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers of each lens, and the like are not limited to the values in the numerical examples shown in the Tables, but may be other values.

What is claimed is:

1. An imaging lens consisting of:
    four groups, a first lens group having negative refractive power, a stop, a second lens group having positive refractive power, a third lens group having negative refractive power, and a fourth lens group having positive refractive power being arranged in this order from the object side,
    wherein only the third lens group moves in the direction of the optical axis to perform focus adjustment,
    the first lens group consists of a biconvex lens, a cemented lens constituted by a lens having positive refractive power and a lens having negative refractive power, and a plurality of lenses which include at least one or more lenses having positive refractive power and at least one or more lenses having negative refractive power, in this order from the object side,
    the second lens group includes at least one or more cemented lenses constituted by a lens having positive refractive power and a lens having negative refractive power,
    the third lens group consists of a single lens having a meniscus shape with a convex surface toward the object side and negative refractive power or consists of a plurality of lenses having negative refractive power as a whole, which are configured in such a manner that the absolute value of the radius of curvature of a lens surface disposed on the most image side is smaller than the absolute value of the radius of curvature of a lens surface disposed on the most object side,
    the fourth lens group includes at least one or more lenses having positive refractive power, and
    conditional expression (1) is satisfied:

$$0.7 < |f3|/f < 4.0, \text{ where} \tag{1}$$

f3: the focal length of the third lens group, and
    f: the focal length of the entire lens system in a state focused on an object point at infinity.

2. The imaging lens of claim 1, wherein conditional expression (1') below is satisfied:

$$1.0 < |f3|/f < 3.0 \tag{1'}$$

3. The imaging lens of claim 1, wherein conditional expression (1") below is satisfied:

$$1.2 < |f3|/f < 2.0 \tag{1''}$$

4. The imaging lens of claim 1, wherein conditional expression (2) below is satisfied:

$$0.6 < |f1|/f < 18.0 \tag{2}, \text{ where}$$

f1: the focal length of the first lens group, and
    f: the focal length of the entire lens system in a state focused on an object point at infinity.

5. The imaging lens of claim 4, wherein conditional expression (2') below is satisfied:

$$1.2 < |f1|/f < 10.0 \tag{2'}$$

6. The imaging lens of claim 4, wherein conditional expression (2") below is satisfied:

$$2.5 < |f1|/f < 4.5 \tag{2''}$$

7. The imaging lens of claim 1, wherein conditional expression (3) below is satisfied:

$$0.2 < f2/f < 5.0 \tag{3}, \text{ where}$$

f2: the focal length of the second lens group, and
f: the focal length of the entire lens system in a state focused on an object point at infinity.

8. The imaging lens of claim 7, wherein conditional expression (3') below is satisfied:

$$0.5 < f2/f < 3.5 \qquad (3').$$

9. The imaging lens of claim 7, wherein conditional expression (3") below is satisfied:

$$0.8 < f2/f < 1.2 \qquad (3").$$

10. The imaging lens of claim 1, wherein conditional expression (4) below is satisfied:

$$0.8 < f4/f < 8.0 \qquad (4),$$ where f4: the focal length of the fourth lens group, and
f: the focal length of the entire lens system in a state focused on an object point at infinity.

11. The imaging lens of claim 10, wherein conditional expression (4') below is satisfied:

$$1.0 < f4/f < 4.0 \qquad (4').$$

12. The imaging lens of claim 10, wherein conditional expression (4") below is satisfied:

$$1.3 < f4/f < 1.8 \qquad (4").$$

13. The imaging lens of claim 1, wherein conditional expression (5) below is satisfied:

$$0.5 < (R3f+R3r)/(R3f-R3r) < 6.0 \qquad (5),$$ where

R3f: a radius of curvature of a lens surface disposed on the most object side of the third lens group, and
R3r: a radius of curvature of a lens surface disposed on the most image side of the third lens group.

14. The imaging lens of claim 13, wherein conditional expression (5') below is satisfied:

$$1.0 < (R3f+R3r)/(R3f-R3r) < 4.5 \qquad (5').$$

15. The imaging lens of claim 1, wherein at least one of a lens having positive refractive power and a lens having negative refractive power which constitute the cemented lens included in the first lens group satisfies conditional expression (6) below:

$$22.0 < |vd(1P) - vd(1N)| \qquad (6),$$ where vd(1P): the Abbe number of the lens having positive refractive power which constitutes the cemented lens, and
vd(1N): the Abbe number of the lens having negative refractive power which constitutes the cemented lens.

16. The imaging lens of claim 15, wherein conditional expression (6') is satisfied:

$$35.0 < |vd(1P) - vd(1N)| \qquad (6').$$

17. The imaging lens of claim 1, wherein the first lens group consists of a lens having positive refractive power on the most image side in the first lens group;
    in the second group, a cemented lens formed by two lenses cemented to each other, between which the absolute number of the difference of the Abbe numbers is the greatest among cemented lenses formed by cementing a lens having positive refractive power and a lens having negative refractive power together included therein, satisfies conditional expression (7) below; and
    a lens having positive refractive power disposed on the most image side in the first lens group satisfies conditional expression (8) below:

$$20.0 < |vd(2P) - vd(2N)| \qquad (7)$$

$$vd(1R) < 35.0 \qquad (8),$$ where vd(2P): the Abbe number of the lens having positive refractive power which constitutes the cemented lens,
vd(2N): the Abbe number of the lens having negative refractive power which constitutes the cemented lens, and
vd(1R): the Abbe number of the lens which is disposed on the most image side in the first lens group.

18. The imaging lens of claim 17, wherein conditional expression (7') below:

$$32.0 < |vd(2P) - vd(2N)| \qquad (7').$$

19. The imaging lens of claim 17, wherein conditional expression (8') below:

$$vd(1R) < 30.0 \qquad (8').$$

20. An imaging apparatus comprising:
the imaging lens, as defined in claim 1.

* * * * *